United States Patent
Allen et al.

(10) Patent No.: US 9,945,349 B2
(45) Date of Patent: Apr. 17, 2018

(54) HYDRAULIC APPARATUS

(71) Applicant: CETO IP PTY Ltd., Belmont, Western Australia (AU)

(72) Inventors: Greg John Allen, East Fremantle (AU); Ruud Caljouw, Subiaco (AU); Jonathan Pierre Fievez, Melville (AU); David Kessel, Doubleview (AU); Nigel Laxton, Mt Hawthorn (AU); Laurence Drew Mann, Bateman (AU)

(73) Assignee: CETO IP Pty Ltd., Belmont, Western Australia (AU)

( * ) Notice: Subject to any disclaimer, the term of this patent is extended or adjusted under 35 U.S.C. 154(b) by 0 days.

(21) Appl. No.: 14/935,848

(22) Filed: Nov. 9, 2015

(65) Prior Publication Data
US 2016/0208768 A1   Jul. 21, 2016

Related U.S. Application Data

(63) Continuation of application No. 13/508,893, filed as application No. PCT/AU2010/001530 on Nov. 15, 2010, now abandoned.

(30) Foreign Application Priority Data

Nov. 13, 2009 (AU) ............................... 2009905560

(51) Int. Cl.
F03B 13/18 (2006.01)

(52) U.S. Cl.
CPC ........ F03B 13/189 (2013.01); *F05B 2240/40* (2013.01); *F05B 2260/406* (2013.01); *Y02E 10/38* (2013.01)

(58) Field of Classification Search
CPC ......... Y02E 10/20; Y02E 10/28; Y02E 10/30; Y02E 10/32; Y02E 10/38; F03B 13/189; F05B 2260/406
(Continued)

(56) References Cited

U.S. PATENT DOCUMENTS 4,204,406 A  *  5/1980  Hopfe .................... B01D 61/10
                                              290/53
4,208,878 A  *  6/1980  Rainey .................. F03B 13/262
                                              290/53
(Continued)

FOREIGN PATENT DOCUMENTS

WO   2007019640 A1   2/2007
WO   2008052286 A1   5/2008

OTHER PUBLICATIONS

Mattarolo et al. "Wave enerty resource off the French coasts: The ANEMOC database applied to the energy yield evaluation of Wave Energy Converters." Proceedings of the 8th European Wave and Tidal Energy Conference. 2009.
(Continued)

*Primary Examiner* — Mark Laurenzi
*Assistant Examiner* — Mickey France
(74) *Attorney, Agent, or Firm* — Merchant & Gould P.C.

(57) ABSTRACT

A closed-loop hydraulic apparatus 200 for converting wave energy comprises a pump 201 for pumping a fluid through the apparatus 200. The pump 201 includes a body 202 defining a chamber 203, and a piston 207 that partitions the chamber 203 into a working side 208 and a blind side 209. A buoyant actuator is connected to the piston 207. An inlet 64 is connected to the working side 208 of the chamber 203 so that the fluid is able to flow from the inlet 64 and into the working side 208 of the chamber 203. An outlet 63 is connected to the working side 208 of the chamber 203 so that the fluid is able to flow from the working side 208 of the chamber 203 to the outlet 63. A hydraulic controller 102 is operable to control the pump 201 by controlling the pressure of the fluid at the inlet 64 and the outlet 63 so as to optimise the output of the pump 201 in response to tidal variations and/or sea state. The pressure of the fluid at the inlet 64 and
(Continued)

the outlet 63 is controlled in accordance with a control algorithm.

12 Claims, 12 Drawing Sheets

(58) Field of Classification Search
USPC ......... 60/495–507; 290/42, 53; 417/330–333
See application file for complete search history.

(56) References Cited

U.S. PATENT DOCUMENTS

| | | |
|---|---|---|
| 4,392,349 A | 7/1983 | Hagen |
| 4,781,023 A | 11/1988 | Gordon |
| 4,813,815 A | 3/1989 | McGehee |
| 5,179,837 A | 1/1993 | Sieber |
| 6,731,019 B2 | 5/2004 | Burns et al. |
| 7,042,112 B2 | 5/2006 | Wood |
| 2005/0167988 A1 | 8/2005 | Wood |
| 2007/0261404 A1 | 11/2007 | Stewart et al. |
| 2008/0191485 A1 | 8/2008 | Whittaker et al. |
| 2009/0015103 A1 | 1/2009 | Rastegar et al. |
| 2010/0025993 A1* | 2/2010 | Raftery ............... F03B 13/1885 290/42 |
| 2010/0219640 A1* | 9/2010 | Gracia Lopez ..... F03B 13/1815 290/53 |
| 2011/0089696 A1 | 4/2011 | Davis et al. |
| 2011/0148115 A1* | 6/2011 | Roznitsky ............... F03D 1/001 290/44 |
| 2011/0316276 A1* | 12/2011 | Crowley .................. F03B 1/02 290/42 |
| 2012/0187689 A1 | 7/2012 | Crowley |
| 2013/0047601 A1 | 2/2013 | Vuorinen et al. |

OTHER PUBLICATIONS

Indonesian Office Action from Indonesian Application No. HKI-3-HI.05.02.01 dated Jan. 16, 2015 (2 pages).
International Search Report for International Application No. PCT/AU2010/001530 dated Jan. 13, 2011 (5 pages).

* cited by examiner

HYDRAULIC APPARATUS

This application is a Continuation of U.S. Ser. No. 13/508,893, filed 7 Aug. 2012, which is a National Stage Application of PCT/AU2010/001530, filed 15 Nov. 2010, which claims benefit of Serial No. 2009905560, filed 13 Nov. 2009 in Australia and which applications are incorporated herein by reference. To the extent appropriate, a claim of priority is made to each of the above disclosed applications.

FIELD OF THE INVENTION

The present invention relates to hydraulic apparatus for extracting energy from wave motion.

BACKGROUND ART

Hydraulic apparatus for extracting energy from wave motion are known. Examples of such apparatus are disclosed in published International patent applications for CETO™ technology, PCT/AU2006/001187 and PCT/AU2007/001685 which are incorporated herein by reference.

A prior art hydraulic apparatus for extracting energy from wave motion includes a base which is positioned on the seabed of a body of water. An axial hydraulic pump is mounted on the base such that the pump is able to pivot relative to the base. A piston rod of the pump is coupled to a buoyant actuator by a tether. Wave motion and the positive buoyancy of the buoyant actuator causes it to follow the motion of the water disturbance such that the buoyant actuator is forced upwards exerting force on the tether and expelling fluid via one-way valves under pressure from the pump into a manifold. During passage of the wave trough, the buoyant actuator falls under the weight of the pump piston and the force from pump inlet pressure, priming the pump ready for the next upward thrust of the buoyant actuator.

The apparatus is designed to operate in a closed-loop mode where fluid at high pressure is pumped ashore by the hydraulic pump, energy is extracted as useful work, and the reduced pressure fluid is returned via piping to the offshore hydraulic pump to be re-energised.

An alternative prior art hydraulic apparatus is similar to the aforementioned prior art apparatus except that it includes an array of hydraulic pumps, and an array of buoyant actuators that are each tethered to a respective piston rod of each pump.

Prior art apparatus such as those described above typically need to be specifically tailored to operate in a particular location under the particular conditions associated with the location, including the wave conditions and tidal variations that are associated with the location. This usually involves manufacturing non-standard hardware that is specifically designed for use at the particular location, and also configuring the hardware to operate in a particular way that is suitable for the location.

The need to design and manufacture such non-standard hardware means that it is difficult to streamline the manufacturing process to achieve high volumes of production at lower cost.

It is against this background and the problems and difficulties associated therewith that the present invention has been developed.

SUMMARY OF THE INVENTION

It is an object of the present invention to overcome, or at least ameliorate, one or more of the deficiencies of the prior art mentioned above, or to provide the consumer with a useful or commercial choice.

Other objects and advantages of the present invention will become apparent from the following description, taken in connection with the accompanying drawings, wherein, by way of illustration and example, a preferred embodiment of the present invention is disclosed.

According to a first broad aspect of the present invention, there is provided a closed-loop hydraulic apparatus for converting wave energy, the apparatus comprising: a pump for pumping a fluid through the apparatus, the pump including a body defining a chamber, and a piston that partitions the chamber into a working side and a blind side; a buoyant actuator connected to the piston; an inlet connected to the working side of the chamber so that the fluid is able to flow from the inlet and into the working side of the chamber; an outlet connected to the working side of the chamber so that the fluid is able to flow from the working side of the chamber to the outlet; and a hydraulic controller operable to control the pump by controlling the pressure of the fluid at the inlet and the outlet so as to optimise the output of the pump in response to tidal variations and/or sea state, the pressure of the fluid at the inlet and the outlet being controlled in accordance with a control algorithm, wherein the control algorithm is drawn from an ensemble of algorithms which are generated according to an optimal filter approach, and wherein an optimal filter and the control algorithms are generated by the steps of:

(i) determining a power matrix;

(ii) determining the most robust spectral model for sea states applicable to a physical location of the apparatus;

(iii) convolving a sea state spectral density with the power matrix to produce a resultant transfer function;

(vi) performing a multi-parameter optimisation of an energy function obtained by integrating the transfer function over time;

(v) defining operating points and stable operating regions within a vector space of the energy function to generate templates;

(vi) applying a control system transfer function to state variables of the apparatus to generate the control algorithm;

(vii) running a simulation of the control algorithm to verify the accuracy and stability of the algorithm and a set point template; and (viii) repeating steps (i) and (vii) with different sea states as needed to populate the space of required control algorithms.

In a first preferred form the hydraulic controller includes: an inlet hydraulic accumulator; and input hydraulic control valve connected to the inlet and to the inlet hydraulic accumulator; an outlet hydraulic accumulator; an output hydraulic control valve connected to the outlet and to the outlet hydraulic accumulator; a sequence valve connected to the inlet and to the outlet; a first outlet pressure transducer connected to the outlet; a flow meter connected to the outlet; a proportional throttle connected to the flow meter; and a second outlet pressure transducer connected to the proportional throttle.

In a second preferred form the hydraulic controller includes: a working side hydraulic accumulator connected to the working side of the chamber; an outlet hydraulic accumulator connected to the outlet; an inlet hydraulic accumulator connected to the inlet; an outlet valve connected to the outlet; an inlet valve connected to the inlet; a pressure relief valve connected to the outlet and to the inlet valve; an intermediate hydraulic accumulator connected to the inlet valve; a control system; and a plurality of sensors, wherein the control system is operable to control the outlet valve and the inlet valve in response to outputs of the sensors.

In a third preferred form the hydraulic controller includes: a working side hydraulic accumulator connected to the working side of the chamber; an outlet hydraulic accumulator connected to the outlet; an inlet hydraulic accumulator connected to the inlet; a pressure relief valve connected to the outlet and to the inlet; an outlet valve connected to the outlet; an inlet valve connected to the inlet; and an intermediate hydraulic accumulator connected to the inlet valve.

Preferably, the hydraulic controller also includes another pressure relief valve connected to the outlet and to the inlet.

Preferably, the hydraulic controller also includes: a control system; and a plurality of sensors, wherein the control system is operable to control the outlet valve, inlet valve, and the pressure relief valve in response to outputs of the sensors.

Preferably, the sensors include pressure, temperature, and flow sensors.

Preferably, a gas charge in the lines of the working side hydraulic accumulator, outlet hydraulic accumulator, inlet hydraulic accumulator, and the intermediate hydraulic accumulator are able to be varied in accordance with the control algorithm.

Preferably, the outlet valve is a spear valve for a Pelton wheel.

Preferably, the apparatus further comprises: a plurality of pumps for pumping the fluid through the apparatus; a plurality of buoyant actuators connected to the pistons of the pumps; a plurality of inlets connected to the working sides of the pump chambers; and a plurality of outlets connected to the working sides of the pump chambers, and the hydraulic controller includes a plurality of working side hydraulic accumulators connected to the working sides of the pump chambers.

Preferably, the pumps are arranged in an array that is no more than three rows deeps.

Preferably, the pumps are identical pumps.

Preferably, the control algorithm is tuned to provide the maximum integrated energy.

Preferably, step (i) is also repeated as part of step (viii) if the ensemble or space of control algorithms includes variations to the state of the machine/apparatus.

Preferably, the generation of the control algorithms is heuristic.

Preferably, optimisation is achieved by:
(i) determining the power matrix;
(ii) developing and optimising the control system transfer function using the power matrix and a wave model; and
(iii) optimising the transfer function for the particular physical site using a robust physical spectral model for the physical site.

According to a second broad aspect of the present invention, there is provided a method for generating an optimal filter and an ensemble of control algorithms for a closed-loop hydraulic apparatus for converting wave energy, the method comprising the steps of:
(i) determining a power matrix;
(ii) determining the most robust spectral model for sea states applicable to a physical location of the apparatus;
(iii) convolving a sea state spectral density with the power matrix to produce a resultant transfer function;
(iv) performing a multi-parameter optimisation of an energy function obtained by integrating the transfer function over time;
(v) defining operating points and stable operating regions within a vector space of the energy function to generate templates;
(vi) applying a control system transfer function to state variables of the apparatus to generate the control algorithm;
(vii) running a simulation of the control algorithm to verify the accuracy and stability of the algorithm and a set point template; and
(viii) repeating steps (i) to (vii) with different sea states as needed to populate the space of required control algorithms.

Preferably, step (i) is also repeated as part of step (viii) if the ensemble or space of control algorithms includes variations to the state of the machine/apparatus.

Preferably, the generation of the control algorithms is heuristic.

Preferably, the optimisation is achieved by:
(i) determining the power matrix;
(ii) developing and optimising the control system transfer function using the power matrix and a wave model; and
(iii) optimising the transfer function for the particular physical site using a robust physical spectral model for the physical site.

Preferably, the closed-loop hydraulic apparatus for converting wave energy comprises the hydraulic apparatus according to the first broad aspect of the present invention.

According to a third broad aspect of the present invention, there is provided a method for controlling the hydraulic apparatus according to the first broad aspect of the present invention.

According to a fourth broad aspect of the present invention, there is provided a method for obtaining an optimal filter for controlling the hydraulic apparatus according to the first broad aspect of the present invention.

According to a fifth broad aspect of the present invention, there is provided a hydraulic apparatus comprising a pump for pumping fluid through the apparatus, and a control element for controlling the flow of the fluid.

According to a sixth broad aspect of the present invention, there is provided a method of controlling the hydraulic apparatus according to the fifth broad aspect of the present invention, the method comprising the steps of:
operating the pump of the apparatus to pump hydraulic fluid through the apparatus; and
controlling the control element so as to control the flow of the fluid.

Preferably, the pump is an axial hydraulic pump.

Preferably, the control element is an outlet valve, inlet valve, accumulator, and/or a pressure relief valve.

Preferably, the apparatus also includes an outlet check valve.

Preferably, the apparatus also includes an inlet check valve.

Preferably, the apparatus also includes a rod/tuning/working side accumulator.

Preferably, the apparatus also includes a blind side accumulator.

Preferably, the apparatus also includes an outlet accumulator.

Preferably, the apparatus also includes an inlet accumulator.

Preferably, the apparatus also includes a sensor.

Preferably, the apparatus also includes a controller.

Preferably, the apparatus is a closed-loop hydraulic apparatus.

Preferably, the hydraulic apparatus is for extracting energy from wave motion/converting wave energy.

According to a seventh broad aspect of the present invention, there is provided a system for control and optimisation of a wave energy device comprising: a wave energy converter utilising a wave energy converter with hydraulic power takeoff, the converter being operated in a closed loop mode, the closed loop comprising a device outlet line at higher pressure and an inlet fluid line at substantially lower pressure, the fluid circulating in the closed loop being substantially water based, the fluid providing transfer of energy to shore, the fluid transporting energy via pressure and flow, and a means to remove energy from the working fluid onshore via a hydro mechanical device such as a turbine or pressure exchange engine.

Preferably, the system includes control elements that are both onshore and offshore.

Preferably, the control elements comprise: valves regulating the pressure and flow in the outlet line and the inlet lines onshore, an offshore pressure relief valve located between the inlet and outlet lines, hydraulic accumulators located offshore, and hydraulic accumulators located onshore, one connected to the outlet line and another connected to the input line, and a pressure relief valve located onshore between the inlet and outlet lines.

Preferably, a control algorithm is used to control the plurality of hydraulic valves and gas pressure charges in the accumulators.

According to an eighth broad aspect of the present invention, there is provided a control algorithm for the system according to the fifth broad aspect of the present invention. Preferably, the control algorithm is able to perform one or more of the following functions or has one or more of the following properties:

a. Adjusts the mechanical stiffness by means of accumulator volume variation (open/close valves) of the CETO™ wave energy converter (WEC) between, and including, the two extremes of piston constrained and piston free. 'Piston-constrained' refers to the situation where the piston will experience the minimum amount of movement because the hydraulic fluid is constrained against movement inside the hydraulic circuit to the extent allowed by the tuning accumulator; and 'piston free' refers to the case where there is free flow of fluid between inlet and outlet circuits and the piston motion is free to move under the influence of its own weight and the external force applied to it.

b. Adjusts the reference position of the piston of the pump in the case of CETO™ to accommodate slow variations in water depth as would occur for tides.

c. Adjust the control elements of the WEC device according to real time inputs from a nearby wave measuring apparatus. Such apparatus may record instantaneous wave height (H), wave period (T), and wave spread (A) and any other relevant parameters that define the sea state and may provide this data in real time to the algorithm.

d. Adjusts the setting in c) so that the power P is an instantaneous maximum.

e. Adjusts the settings in c) so that the power P is an instantaneous minimum. Such a condition may be desirable if maintenance or inspection is being carried out.

f. Adjusts the settings in c) so that P exceeds a minimum value $P_m$ with a probability $p_m$.

g. Applies a preset template F to constrain the values of the control elements which maximises the total power delivered by a WEC in a time interval τ.

h. The time interval τ may be variable over a range of epochs $\tau_\epsilon$ from seconds to minutes to hours. For example, standard offshore practice is 20 minutes for a continuous irregular sea state and three hours for an extreme sea state.

i. Each epoch $\tau_\epsilon$ will be associated with a unique template $F_\epsilon$ which defines a set operating point for, and range of control exerted by, the algorithm A.

j. The control algorithm A may comprise a series of templates $F_\epsilon$ as in i) such that each template cooperates to provide the optimum energy output $E_{max}$ over any time epoch between the shortest and the longest. That is, the algorithm A is always tuned to providing the maximum integrated energy $E_{max}$ where $$E_{max} = \int_{\tau_{\epsilon min}}^{\tau_{\epsilon max}} P(A, F_\epsilon(\tau))dt$$

k. The particular algorithm A may also be drawn from an ensemble of algorithms $A_i$ where the ensemble $A_i$ includes elements that are specific to one or more of the following conditions:

i. A particular geographic location;
ii. A particular water depth and bathymetry;
iii. A particular classification of wave activity for example, energetic, offshore, mild, inshore, or combinations of these;
iv. A particular time of the year, for instance, winter, summer;
v. A particular configuration of the WEC;
vi. A particular physical configuration of the WEC including an energy relief mechanism as has been described in CETO™ co-pending patent applications;
vii. A particular physical state of the WEC corresponding to the age, state, to operating history of the WEC;
viii. Any other variations in the configuration of the WEC;
ix. Yearly dominate sea states. For example, a site at Garden Island off the coast of Western Australia has between 6 and 8 dominate sea states; and
x. A particular safety/emergency condition.

According to a ninth broad aspect of the present invention, there is provided a system comprising an array of WEC's connected together in parallel to a common set of inlet and outlet piping forming a closed loop system according to any one of the seventh through eighth aspects of the present invention.

According to a tenth broad aspect of the present invention, there is provided a system according to the ninth broad aspect of the present invention where the optimisation of the algorithm A is also sensitive to the wave spread. The algorithms $A_i$ and the templates $F_\epsilon$ are materially different from those of a single WEC. Note that for multiple units the difference in algorithm compared to the single unit is dominated by the hydraulic interaction between units.

According to an eleventh broad aspect of the present invention, there is provided a system according to any one of the seventh through tenth broad aspects of the present invention, where the algorithms $A_i$ are generated according to an optimal filter approach.

According to a twelfth broad aspect of the present invention, there is provided a hydraulic apparatus comprising:

a hydraulic pump including a body defining a chamber, and a piston that partitions the chamber into a working side and a blind side; and a blind side hydraulic accumulator connected to the blind side of the chamber.

Preferably, the blind side hydraulic accumulator is connected in parallel to the blind side of the chamber. Alternatively, the blind side hydraulic accumulator is connected in series with the blind side of the chamber. Preferably, the apparatus also includes a closed blind side hydraulic circuit that includes the blind side hydraulic accumulator and the blind side of the chamber.

Preferably, the apparatus also includes a fluid that is able to flow between the blind side hydraulic accumulator and the blind side of the chamber. Preferably, the fluid is a high lubricity fluid. Preferably, the fluid is a low viscosity fluid.

Preferably, the apparatus also includes a blind side mechanical dampener secured to the piston. Preferably, the blind side mechanical dampener is an elastic dampener. Alternatively, the blind side mechanical dampener is a spring.

Preferably, the apparatus also includes a working side mechanical dampener secured to the piston. Preferably, the working side mechanical dampener is an elastic dampener. Alternatively, the working side mechanical dampener is a spring.

Preferably, the apparatus also includes a working side hydraulic accumulator connected to the working side of the chamber. Preferably, the working side hydraulic accumulator is connected in parallel to the working side of the chamber. Alternatively, the working side hydraulic accumulator is connected in series with the working side of the chamber.

Preferably, the apparatus also includes an outlet check valve connected to the working side of the chamber, and an inlet check valve connected in parallel to the outlet check valve. In some embodiments, the inlet check valve is connected to the blind side of the chamber. Preferably, the apparatus also includes an outlet hydraulic accumulator connected in parallel to the outlet check valve. Preferably, the apparatus also includes an inlet hydraulic accumulator connected in parallel to the inlet check valve.

Preferably, the apparatus also includes a hydraulic interface unit that includes the outlet check valve, the inlet check valve, the outlet hydraulic accumulator, and the inlet hydraulic accumulator. Preferably, the hydraulic interface unit also includes the blind side hydraulic accumulator. Preferably, the hydraulic interface unit also includes the working side hydraulic accumulator. Preferably, the hydraulic interface unit also includes a pressure relief valve.

Preferably, the apparatus also includes a hydraulic controller connected to the outlet check valve and the inlet check valve. Preferably, the hydraulic controller includes a pressure relief valve. Preferably, the apparatus also includes a high pressure pipeline that connects the hydraulic controller to the outlet check valve, and a low pressure pipeline that connects the hydraulic controller to the inlet check valve. Preferably, the apparatus also includes a hydraulic load connected to the hydraulic controller.

Preferably, the apparatus is a closed-loop hydraulic apparatus.

Preferably, the apparatus is for extracting energy from wave motion/converting wave energy. In a particular preferred form, the apparatus also includes a buoyant actuator tethered to the piston.

According to a thirteenth broad aspect of the present invention, there is provided a hydraulic apparatus comprising:

a hydraulic pump including a body defining a chamber, and a piston that partitions the chamber into a working side and a blind side; and a working side hydraulic accumulator connected to the working side of the chamber.

Preferably, the working side hydraulic accumulator is connected in parallel to the working side of the chamber. Alternatively, the working side hydraulic accumulator is connected in series with the working side of the chamber.

Preferably, the apparatus also includes a working side mechanical dampener secured to the piston. Preferably, the working side mechanical dampener is an elastic dampener. Alternatively, the working side mechanical dampener is a spring.

Preferably, the apparatus also includes a blind side mechanical dampener secured to the piston. Preferably, the blind side mechanical dampener is an elastic dampener. Alternatively, the blind side mechanical dampener is a spring.

Preferably, the apparatus also includes a blind side hydraulic accumulator. Preferably, the blind side hydraulic accumulator is connected in parallel to the blind side of the chamber. Alternatively, the blind side hydraulic accumulator is connected in series with the blind side of the chamber. Preferably, the apparatus also includes a closed blind side hydraulic circuit that includes the blind side hydraulic accumulator and the blind side of the chamber.

Preferably, the apparatus also includes a fluid that is able to flow between the blind side hydraulic accumulator and the blind side of the chamber. Preferably, the fluid is a high lubricity fluid. Preferably, the fluid is a low viscosity fluid.

Preferably, the apparatus also includes an outlet check valve connected to the working side of the chamber, and an inlet check valve connected in parallel to the outlet check valve. In some embodiments, the inlet check valve may be connected to the blind side of the chamber. Preferably, the apparatus also includes an outlet hydraulic accumulator connected in parallel to the outlet check valve. Preferably, the apparatus also includes an inlet hydraulic accumulator connected in parallel to the inlet check valve.

Preferably, the apparatus also includes a hydraulic interface unit that includes the outlet check valve, the inlet check valve, the outlet hydraulic accumulator, and the inlet hydraulic accumulator. Preferably, the hydraulic interface unit also includes the blind side hydraulic accumulator. Preferably, the hydraulic interface also includes the working side hydraulic accumulator. Preferably, the hydraulic interface unit also includes a pressure relief valve.

Preferably, the apparatus also includes a hydraulic controller connected to the outlet check valve and the inlet check valve. Preferably, the hydraulic controller includes a pressure relief valve. Preferably, the apparatus also includes a high pressure pipeline that connects the hydraulic controller to the outlet check valve, and a low pressure pipeline that connects the hydraulic controller to the inlet check valve. Preferably, the apparatus also includes a hydraulic load connected to the hydraulic controller.

Preferably, the apparatus is a closed-loop hydraulic apparatus.

Preferably, the apparatus is for extracting energy from wave motion/converting wave energy. In a particular preferred form, the apparatus also includes a buoyant actuator tethered to the piston.

According to a fourteenth broad aspect of the present invention, there is provided a hydraulic apparatus comprising a hydraulic pump for circulating a fluid through the apparatus, and a hydraulic controller for controlling the apparatus.

Preferably, the hydraulic pump includes a body defining a chamber, and a piston that partitions the chamber into a working side and a blind side.

Preferably, the apparatus includes a blind side hydraulic accumulator connected to the blind side of the chamber. Preferably, the blind side hydraulic accumulator is connected in parallel to the blind side of the chamber. Alternatively, the blind side hydraulic accumulator is connected in series with the blind side of the chamber. Preferably, the apparatus also includes a closed blind side hydraulic circuit that includes the blind side hydraulic accumulator and the blind side of the chamber.

Preferably, the apparatus also includes a fluid that is able to flow between the blind side hydraulic accumulator and the blind side of the chamber. Preferably, the fluid is a high lubricity fluid. Preferably, the fluid is a low viscosity fluid.

Preferably, the apparatus also includes a blind side mechanical dampener secured to the piston. Preferably, the blind side mechanical dampener is an elastic dampener. Alternatively, the blind side mechanical dampener is a spring.

Preferably, the apparatus also includes a working side mechanical dampener secured to the piston. Preferably, the working side mechanical dampener is an elastic dampener. Alternatively, the working side mechanical dampener is a spring.

Preferably, the apparatus also includes a working side hydraulic accumulator connected to the working side of the chamber. Preferably, the working side hydraulic accumulator is connected in parallel to the working side of the chamber. Alternatively, the working side hydraulic accumulator is connected in series with the working side of the chamber.

Preferably, the apparatus also includes an outlet check valve connected to the working side of the chamber, and an inlet check valve connected in parallel to the outlet check valve. In some embodiments, the inlet check valve may be connected to the blind side of the chamber. Preferably, the apparatus also includes an outlet hydraulic accumulator connected in parallel to the outlet check valve. Preferably, the apparatus also includes an inlet hydraulic accumulator connected in parallel to the inlet check valve.

Preferably, the apparatus also includes a hydraulic interface unit that includes the outlet check valve, the inlet check valve, the outlet hydraulic accumulator, and the inlet hydraulic accumulator. Preferably, the hydraulic interface unit also includes the blind side hydraulic accumulator. Preferably, the hydraulic interface unit also includes the working side hydraulic accumulator.

Preferably, the hydraulic controller is able to control the apparatus in accordance with an algorithm.

Preferably, the hydraulic controller is connected to the outlet check valve and the inlet check valve. Preferably, the apparatus also includes a high pressure pipeline that connects the hydraulic controller to the outlet check valve, and a lower pressure pipeline that connects the hydraulic controller to the inlet check valve.

Preferably, the apparatus includes a hydraulic load. Preferably, the load includes a turbine. Preferably, the turbine is a Pelton turbine.

Preferably, the apparatus is a closed-loop hydraulic apparatus.

Preferably, the apparatus is for extracting energy from wave motion/converting wave energy. In a particular preferred form, the apparatus also includes a buoyant actuator tethered to the piston.

BRIEF DESCRIPTION OF THE DRAWINGS

In order that the invention may be more fully understood and put into practice, a preferred embodiment thereof will now be described with reference to the accompanying drawings, in which.

BEST MODE(S) FOR CARRYING OUT THE INVENTION

Figure 1:
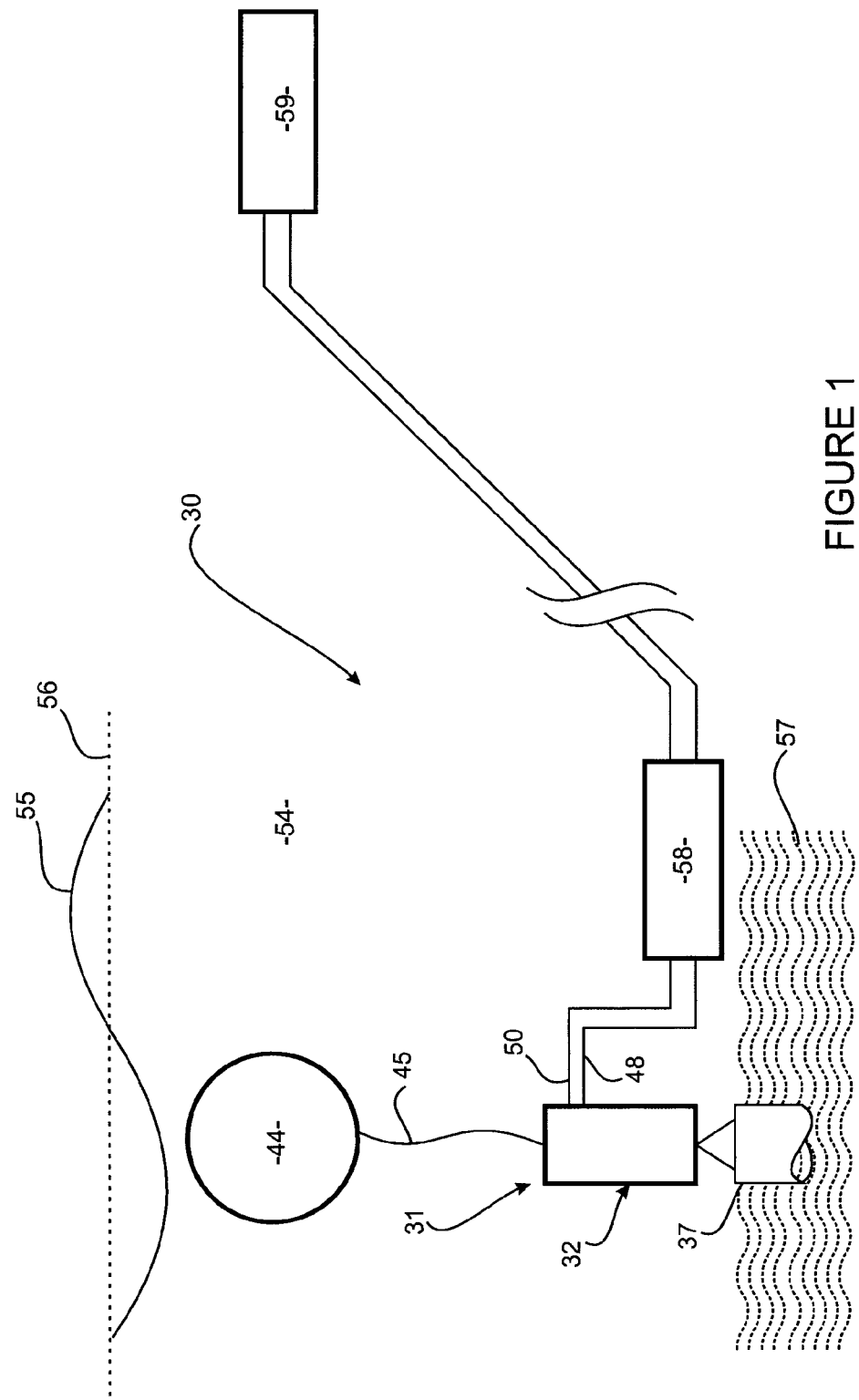
FIG. 1 is a schematic diagram of a first preferred embodiment of a hydraulic apparatus.
Figure 2:
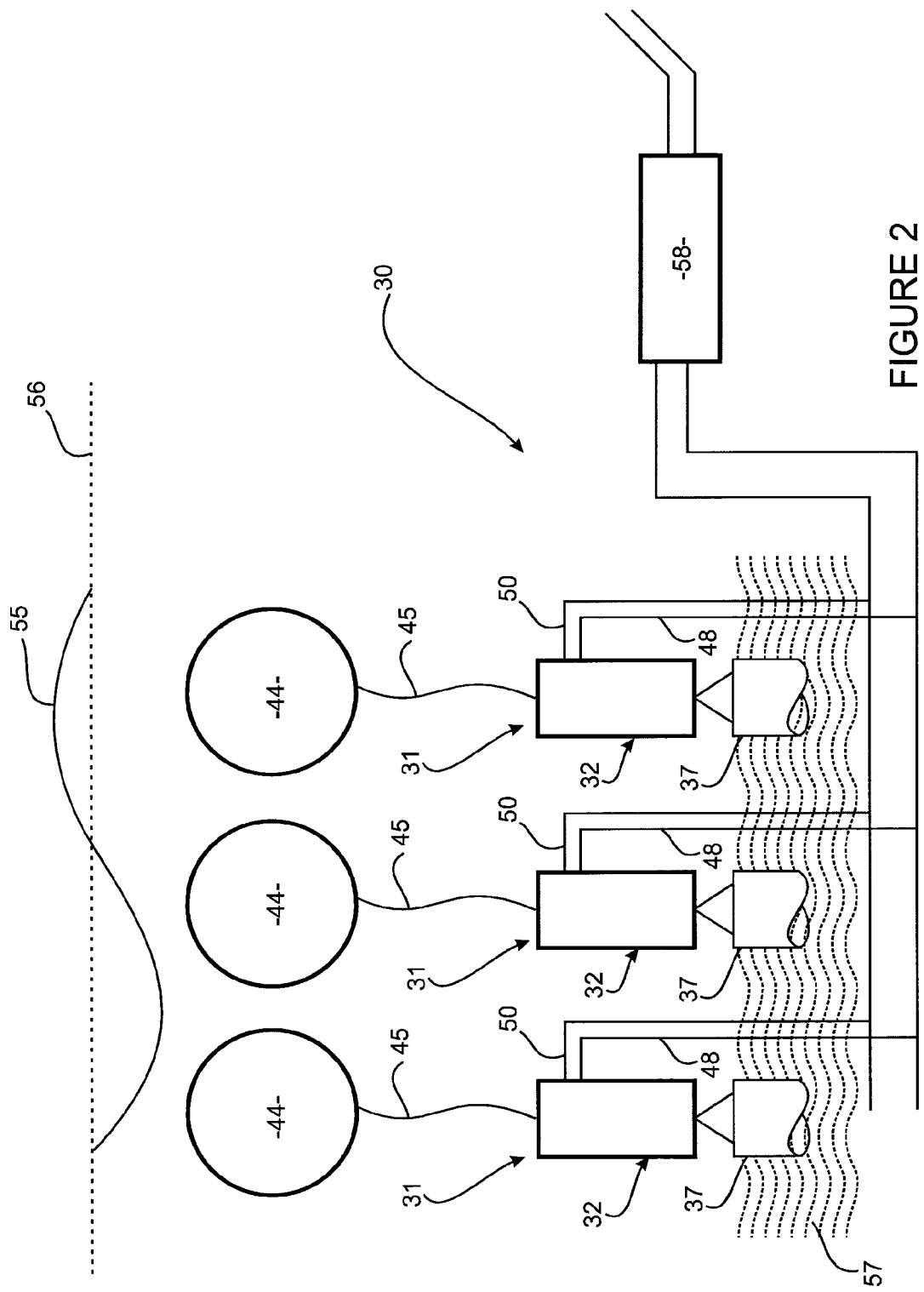
FIG. 2 is a schematic diagram of a second preferred embodiment of a hydraulic apparatus.
Figure 3:
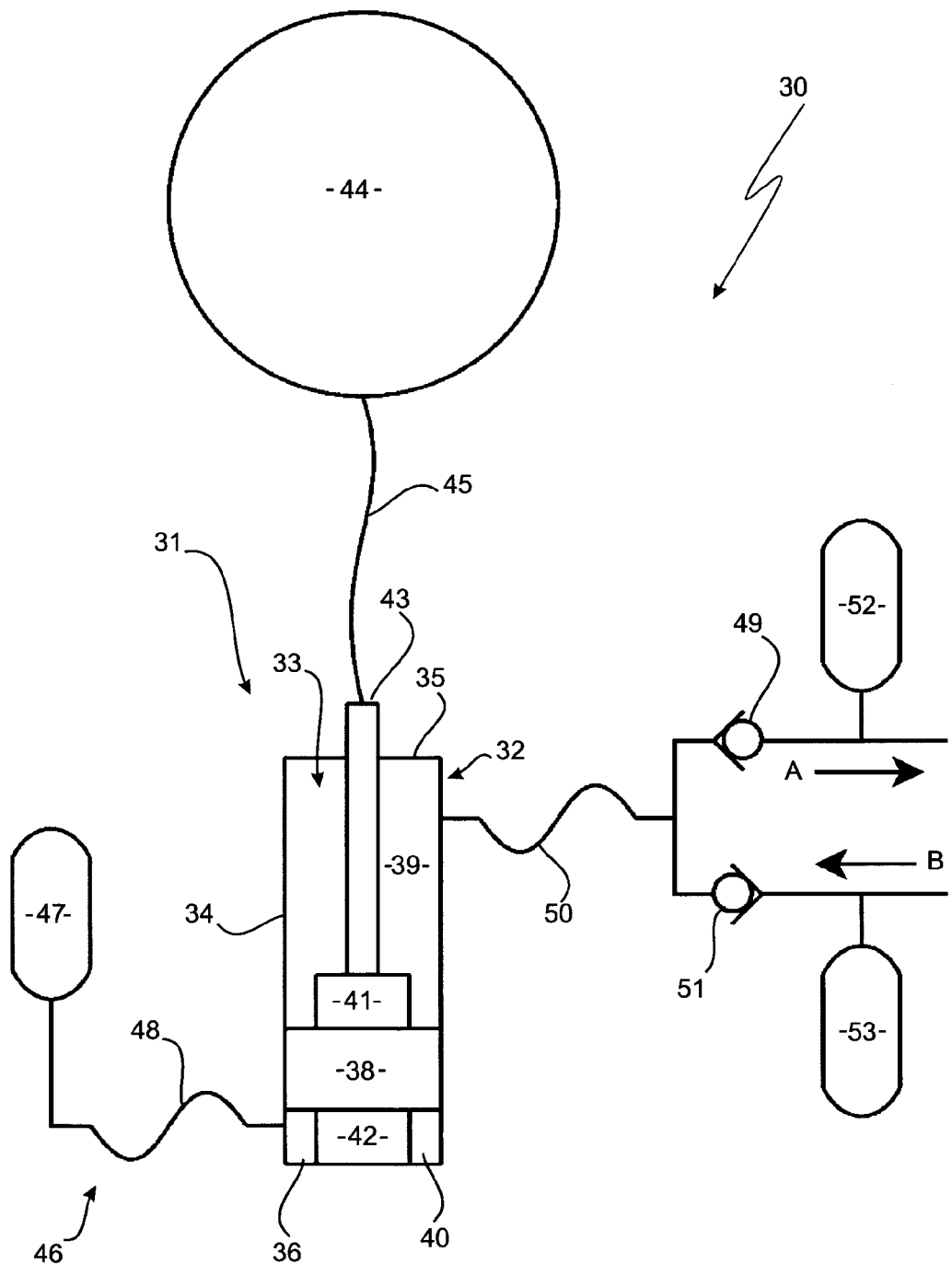
FIG. 3 is a schematic diagram depicting further detail of part of the hydraulic apparatus illustrated in FIGS. 1 and 2, including a cross-sectional side elevation of an axial hydraulic pump of the apparatus.

Referring to FIGS. 1 to 3, a closed loop hydraulic apparatus 30 for extracting energy from wave motion/converting wave energy includes an axial hydraulic pump 31 that includes a pump body 32 defining a chamber 33. The pump body 32 includes a side wall 34 having an upper end which is closed by a top wall 35, and a lower end which is closed by a bottom wall 36. The bottom wall 36 is configured for attachment to a base 37.

A piston 38 is received by the chamber 33 such that the piston 38 partitions the chamber 33 into a rod or working side 39 and a blind side 40, and such that the piston 38 is able to slide back and forth within the chamber 33. A seal (not depicted) between the piston 38 and the side wall 34 inhibits fluid from flowing past the piston 38 and between the working side 39 and the blind side 40. Ideally, the working side 39 and the blind side 40 of the chamber 33 do not communicate within the pump 31 owing to the perfect sealing of the moving piston 38 with the side wall 34 of the pump 31. Some leakage between the two chambers may be tolerated as the seal wears.

A working side mechanical dampener 41 is secured to the piston 38 such that the dampener 41 is located on the working side 39 of the chamber 33. A blind side mechanical dampener 42 is secured to the piston 38 such that the dampener 42 is located on the blind side 40 of the chamber 33.

A piston rod 43 extends from the piston 38 and through an opening in the top wall 35 of the pump body 32 such that the rod 43 is able to move back and forth with the piston 38 relative to the body 32. A seal (not depicted) inhibits fluid from leaking out of the chamber 33 through the opening.

A buoyant actuator 44 is connected to an upper end of the piston rod 43 by a tether 45.

Apparatus 30 also includes a blind side hydraulic circuit 46 that includes the blind side 40 of the chamber 33 and a blind side hydraulic accumulator 47. The circuit 46 is closed so that a fluid may be exchanged only between the blind side 40 of the chamber 33 and the accumulator 47. The accumulator 47 is connected to the blind side 40 of the chamber 33 by a hose 48 so that the fluid is able to flow between the accumulator 47 and the blind side 40 of the chamber 33. There is minimum impedance to the blind side hydraulic accumulator 47 at all times except for the cushioning zone which is managed through obstruction of the pump ports by a piston stop ring.

The fluid in the blind side circuit 46 contains a mixture of fluid and gas according to standard practice. The accumulator 47 is there purely as a reservoir and ideally doesn't offer any damping.

The fluid in the blind side circuit 46 may be a low viscosity fluid. As with many piston accumulators, the blind side could be filled entirely with a gas such as nitrogen to reduce hydrodynamic losses when compared with a fluid. This would also have the benefit of much lower cost and smaller accumulators.

The fluid in the blind side circuit 46 may incorporate a fluid of high lubricity that is, lubricating ability. This lubrication can improve piston seal life. This fluid could also be used to lubricate the rod seal via a capillary tube (not shown). Since the required volume of lubricating fluid required is relatively low the additional cost would be offset by the savings on maintenance and down-time.

Apparatus 30 also includes an outlet check valve 49 connected to the working side 39 of the chamber 33 by a hose 50 so that a fluid is able to flow from the chamber 33 and through the valve 49 in the direction indicated by the arrow 'A'. An inlet check valve 51 is connected in parallel to the outlet check valve 49 and the hose 50 so that a fluid is able to flow through the valve 51 and into the chamber 33 in the direction indicated by the arrow 'B'.

An outlet hydraulic accumulator 52 is connected in parallel to the outlet check valve 49. An inlet hydraulic accumulator 53 is connected in parallel to the inlet check valve 51.

With particular reference to FIG. 1, in use, part of the apparatus 30 is positioned offshore in a body of water 54 such as the sea or ocean that has a water surface 55 and a mean sea level 56. The hydraulic pump 31 is secured to the base 37 which rests on a seabed 57 of the body of water 54. The pump 31 is secured to the base 37 such that the pump 31 is able to pivot relative to the base 37. The check valves 49 and 51, and accumulators 47, 52 and 53 are located in a hydraulic interface unit 58 which is also located offshore. A high pressure outlet of the hydraulic interface unit 58 is connected to a high pressure inlet of an onshore plant 59 by a high pressure pipeline, and a low pressure inlet of the hydraulic interface unit 58 is connected to a low pressure outlet of the onshore plant by a low pressure pipeline.

The buoyant actuator 44 resides in the body of water 54 so that wave motion of the body of water and the positive buoyancy of the actuator 44 causes it to follow the motion of the water disturbance such that the actuator 44 is forced upwards exerting force on the tether 45 which in turn forces the piston 38 to move upwardly in the chamber 33 towards the top wall 35 of the pump body 32. As the piston 38 moves upwardly, fluid on the working side 39 of the chamber 33 is forced out of the chamber 33 through the hose 50 and the outlet check valve 49 in the direction indicated by the arrow A.

Some of the energy of the fluid that is pumped through the outlet check valve 49 is stored in the outlet accumulator 52 which functions to smooth the flow of the fluid through the high pressure section of a closed-loop hydraulic circuit that the outlet check valve 49 and accumulator 52 form part of. The fluid flows around the rest of the circuit before flowing back to the pump 31 through a separate branch of the circuit in the direction indicated by the arrow B.

As the piston 38 moves upwardly within the chamber 33, fluid in the closed blind side hydraulic circuit 46 moves from the accumulator 47 through the hose 48 and into the blind side 40 of the chamber 33. The fluid in the circuit 46 is a high lubricity and low viscosity fluid.

The working side mechanical dampener 41 dampens the movement of the piston 38 as it approaches the top wall 35 of the pump body 32 so as to inhibit the piston 38 and the pump body 32 from being damaged during the up-stroke of the piston 38. In particular, the working side mechanical dampener 41 reduces shock-loading on the pump 31 and the tether 45 during the up-stroke.

During passage of the wave trough over the apparatus 30, the buoyant actuator 44 falls under the weight of the piston 38, and the force of the fluid flows in a closed hydraulic circuit and returns to the working side 39 of the chamber 33 by passing through the inlet check valve 51 and the hose 50 in the direction indicated by the arrow B. Some of the energy of the returning fluid is stored in the inlet accumulator 53 which functions to smooth the flow of the fluid through the low pressure section of the closed-loop hydraulic circuit.

As the piston 38 moves downwardly within the chamber 33, the high lubricity and low viscosity fluid in the blind side 40 of the chamber 33 moves from the chamber 33 back to the accumulator 47 through the hose 48. Ideally, the accumulator 47 does not provide any hydraulic dampening, but simply functions as a reservoir.

The blind side mechanical dampener 42 dampens the movement of the piston 38 as it approaches the bottom wall 36 of the pump body 32 so as to inhibit the piston 38 and the pump body 32 from being damaged during the down-stroke of the piston 38. In particular, the blind side mechanical dampener 42 reduces shock-loading on the pump 31 and the tether 45 during the down-stroke.

The cycle repeats each time a wave crest and a wave trough pass over the apparatus 30.

With particular reference to FIG. 2, the apparatus 30 may include an array of pumps 31 and buoyant actuators 44 connected to the hydraulic interface unit 58.

Figure 4:
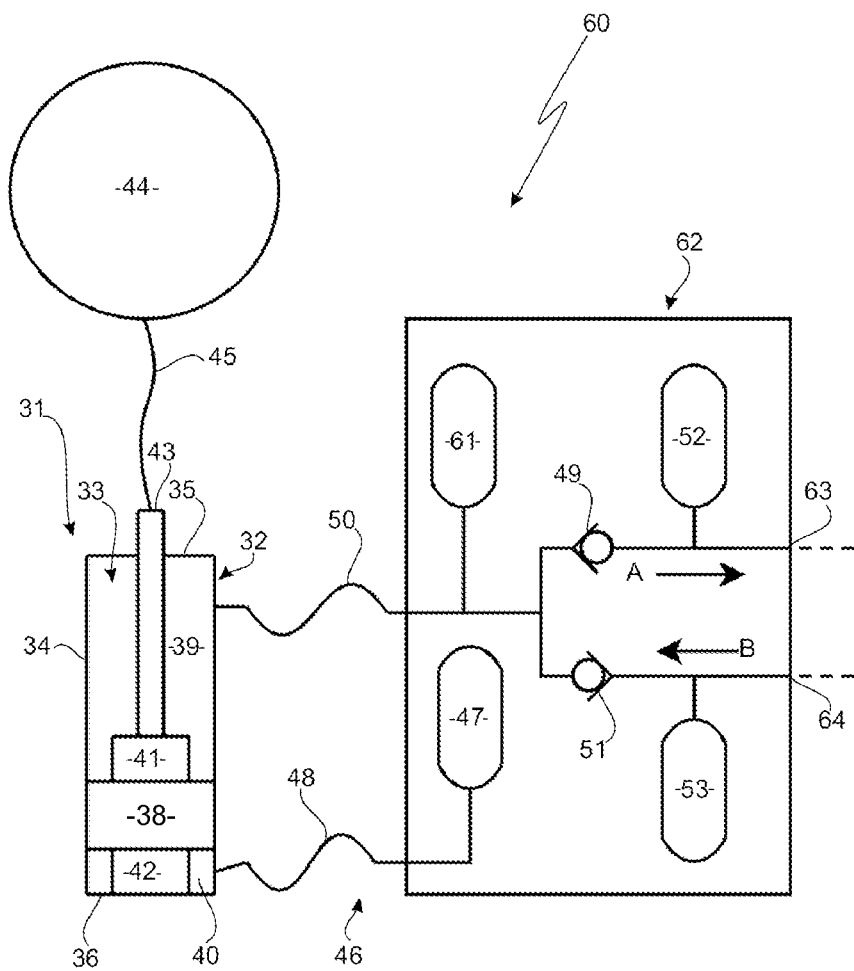
FIG. 4 is a schematic diagram of a third preferred embodiment of a hydraulic apparatus, including a cross-sectional side elevation of an axial hydraulic pump of the apparatus.

Referring to FIG. 4, a hydraulic apparatus 60 for extracting energy from wave motion/converting wave energy is similar to the apparatus 30. Therefore, like features of the apparatus 60 and 30 have been referenced with like reference numerals.

Apparatus 60 differs from apparatus 30 in that the apparatus 60 also includes a working side hydraulic accumulator 61 connected in parallel to the working side 39 of the chamber 33 by the hose 50 so that fluid is able to flow between the chamber 33 and the working side hydraulic accumulator 61.

Moreover, apparatus 60 includes a hydraulic interface unit 62 that includes the blind side hydraulic accumulator 47, outlet check valve 49, inlet check valve 51, outlet hydraulic accumulator 52, inlet hydraulic accumulator 53, and the working side hydraulic accumulator 61.

The hydraulic interface unit 62 includes an outlet 63 and an inlet 64.

The operation of the apparatus 60 is virtually identical to the operation of the apparatus 30, except that the accumulator 61 provides hydraulic dampening for the piston 38 during its upstroke which augments the mechanical dampening provided by the working side mechanical dampener 41.

The hydraulic interface unit 62 is positioned offshore with the pump 31 and the buoyant actuator 44 of the apparatus 60.

Figure 5:
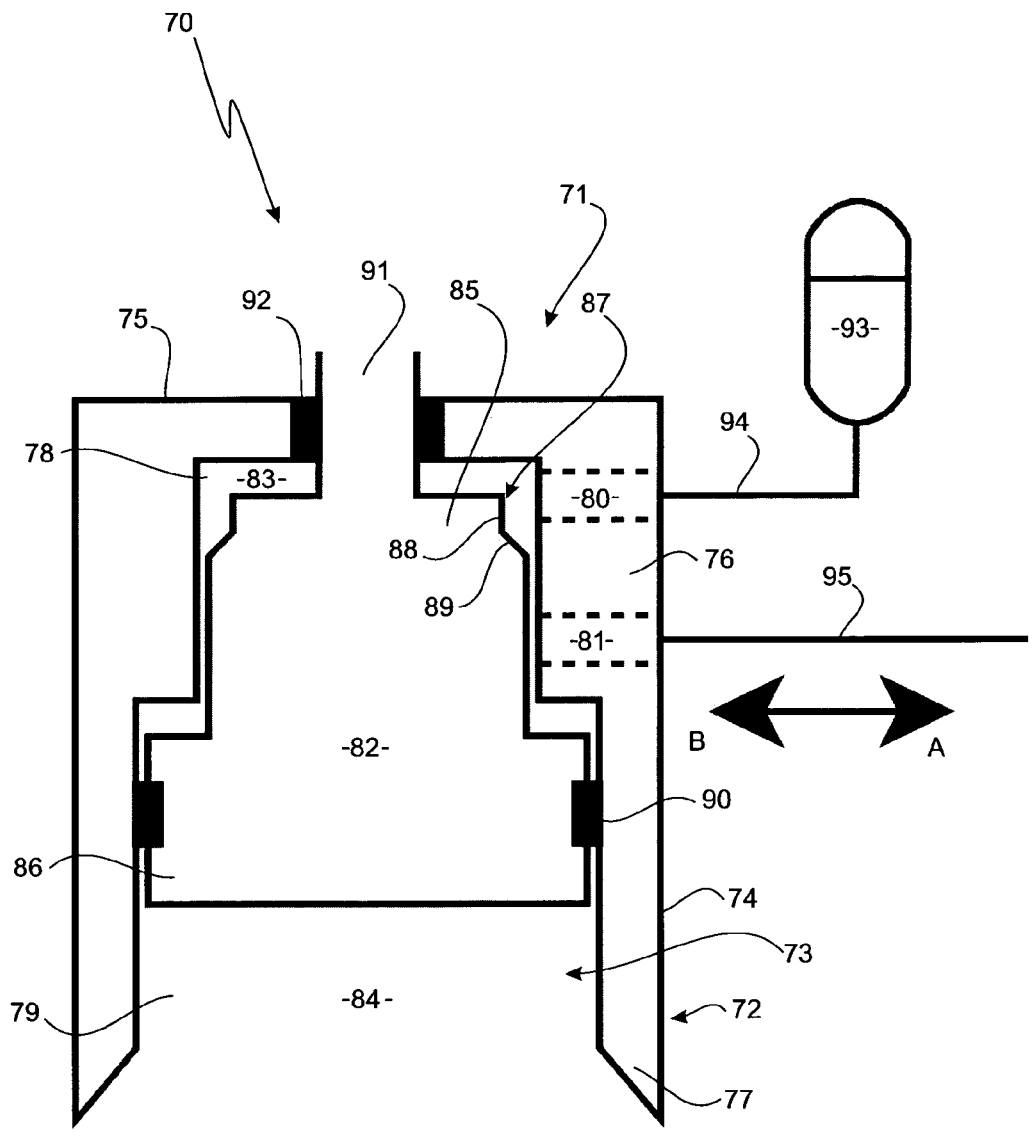
FIG. 5 is a cross-sectional side elevation of a fourth preferred embodiment of a hydraulic apparatus.

Referring to FIG. 5, a hydraulic apparatus 70 for extracting energy from wave motion/converting wave energy includes an axial hydraulic pump 71 that includes a pump body 72 defining a chamber 73. The pump body 72 includes a side wall 74 having an upper end which is closed by a top wall 75. An upper portion 76 of the side wall 74 is thicker than a lower portion 77 of the side wall 74 so that an upper portion 78 of the chamber 73 is narrower than a lower portion 79 of the chamber 73. The upper portion 76 of the side wall 74 includes an upper port 80 and a lower port 81.

A piston 82 is received by the chamber 73 such that the piston 82 partitions the chamber 73 into a working side 83 and a blind side 84, and such that the piston 82 is able to slide back and forth within the chamber 73. Piston 82 includes an upper portion 85 and a wider lower portion 86. Unlike the lower portion 86 of the piston 82, the upper portion 85 of the piston 82 is sufficiently narrow to be received by the upper portion 78 of the chamber 73 as depicted in FIG. 5. A recessed edge 87 extends around the upper periphery of the upper portion 85 of the piston 82. The recessed edge 87 includes a vertical surface 88 and a downwardly sloping surface 89. The recessed edge 87 prevents the piston 82 from completely covering the upper port 80.

A seal 90 between the piston 82 and the side wall 74 inhibits fluid from flowing past the piston 82 and between the working side 83 and the blind side 84.

A piston rod 91 extends from the piston 82 and through an opening in the top wall 75 of the pump body 72 such that the rod 91 is able to move back and forth with the piston 82 relative to the body 72. A seal 92 inhibits fluid from leaking out of the chamber 73 through the opening in the top wall 75.

A working side hydraulic accumulator 93 is connected to the upper port 80 by a hose 94 so that fluid is able to flow back and forth between the working side 83 of the chamber 73 and the working side hydraulic accumulator 93.

A hose 95 is connected to the lower port 81. High pressure fluid is able to be expelled from the chamber 73 through the lower port 81 and the hose 95 in the direction indicated by the arrow 'A', and low pressure fluid is able to be admitted into the chamber 73 through the lower port 81 and the hose 95 in the direction indicated by the arrow 'B'.

Figure 6:
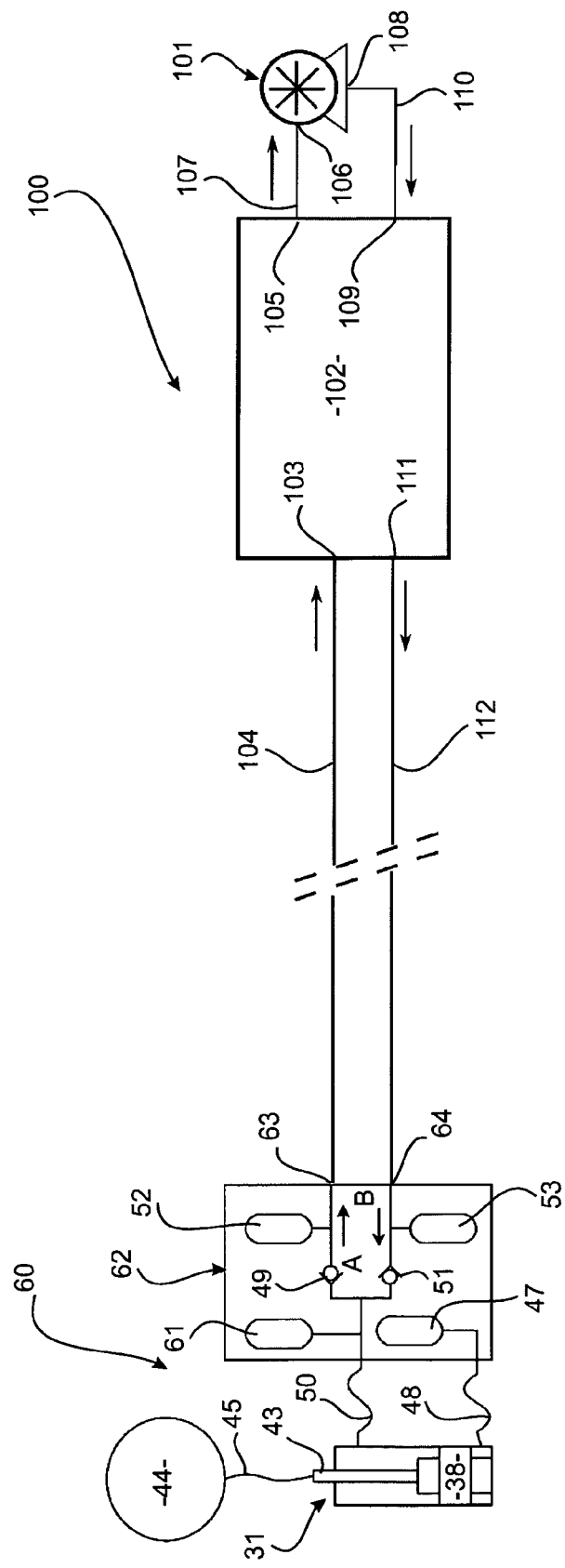
FIG. 6 is a schematic diagram of a fifth preferred embodiment of a hydraulic apparatus, including a cross-sectional side elevation of an axial hydraulic pump of the apparatus.

Referring to FIG. 6, a closed-loop hydraulic apparatus 100 for extracting energy from wave motion/converting wave energy includes a hydraulic load that includes a Pelton turbine 101. The load may also include an electricity generator (not depicted) which is driven by the turbine 101.

Apparatus 100 also includes the apparatus 60 which includes the hydraulic pump 31. Pump 31 operates to pump a fluid through the apparatus 100 to drive the turbine 101.

A hydraulic controller 102 controls the fluid that is pumped through the apparatus 100 by the pump 31. In particular, the controller 102 controls the pressure and flow-rate of the fluid in the high pressure and the low pressure sections of the apparatus 100.

An inlet 103 of the controller 102 is connected to the outlet 63 of the hydraulic interface unit 62 by a high pressure pipeline 104. An outlet 105 of the controller 102 is connected to an inlet 106 of the turbine 101 by a high pressure pipeline 107. An outlet 108 of the turbine 101 is connected to an inlet 109 of the controller 102 by a low pressure pipeline 110. An outlet 111 of the controller 102 is connected to the inlet 64 of the hydraulic interface unit 62 by a low pressure pipeline 112.

With the aid of a closed-loop apparatus such as the apparatus 100 depicted in FIG. 6 it is possible to have a fully closed pump control. A control algorithm, implemented to manage the operation of both the onshore hydraulic control system and the offshore wave energy device 31 and hydraulic interface unit 62, with inputs of force and displacement of the pump, can manage the inlet and outlet pump pressures to maximise output (displacement) but also to reduce impacts at the top and bottom of the pump-stroke. This algorithm both improves plant power output and reduces damage/wear to the pump 31. This approach will also allow for compensation for tidal movements provided that the pump stroke is long enough to cover the tidal range.

The apparatus 100 should maintain a constant rest position with respect to a mean water level of the buoyant actuator in the water column in response to tidal variations. This may be achieved with the closed-loop control arrangement.

The control algorithm would be specific to site location and would incorporate information about the local wave regime and the tidal range and would provide optimised operation of the wave energy converter at that site. For example, the wave energy converter may be deployed off the coast of Western Australia as well as in locations in Europe and in some French Overseas Territories. All of the sites may have different tidal ranges and different wave statistics. The use of a site-specific, tailored control algorithm allows the same generic plant and offshore hardware to be deployed optimally at each and every site.

Moreover, it allows artificial, or pseudo, control of the buoyancy of the buoyant actuator. This may be achieved by managing the pump inlet pressure to synthetically reduce the physical buoyancy of the buoyant actuator 44. This has the benefit of allowing operation (downward movement) of the buoyant actuator 44 during smaller wave conditions. Outlet pressure does not alter the effective buoyancy of the buoyant actuator but in a similar way can be managed to ensure operation (upward movement) over a range of wave conditions.

In addition, it allows a degree of hydraulic 'stretch' to be incorporated into the transfer function of the tether. The required stiffness characteristics of the apparatus 100 cannot typically be achieved through mechanical tether stretch alone and accumulators within the hydraulic circuit can be used to provide hydraulic 'stretch' to achieve the required characteristics.

The apparatus 100 can provide cushioning energy recovery. Accumulators of the apparatus 100 can be used to absorb some of the cushioning energy during the cushioning phase of the piston motion, and can deliver this energy back into the system for subsequent absorption by the working fluid.

Each of the aforementioned features may be applied individually or progressively to the apparatus 100.

Also, each of the aforementioned features may have application to hydraulic apparatus or systems outside of hydraulic apparatus for extracting energy from wave motion. For example, they may be applicable to hydraulic apparatus or systems where there is:

1. variable force inputs on the hydraulic pump;
2. where there may be the possibility of damage due to extreme motion of the hydraulic pump; and
3. long-term wear or leakage that must be compensated for in the system.

Figure 7:
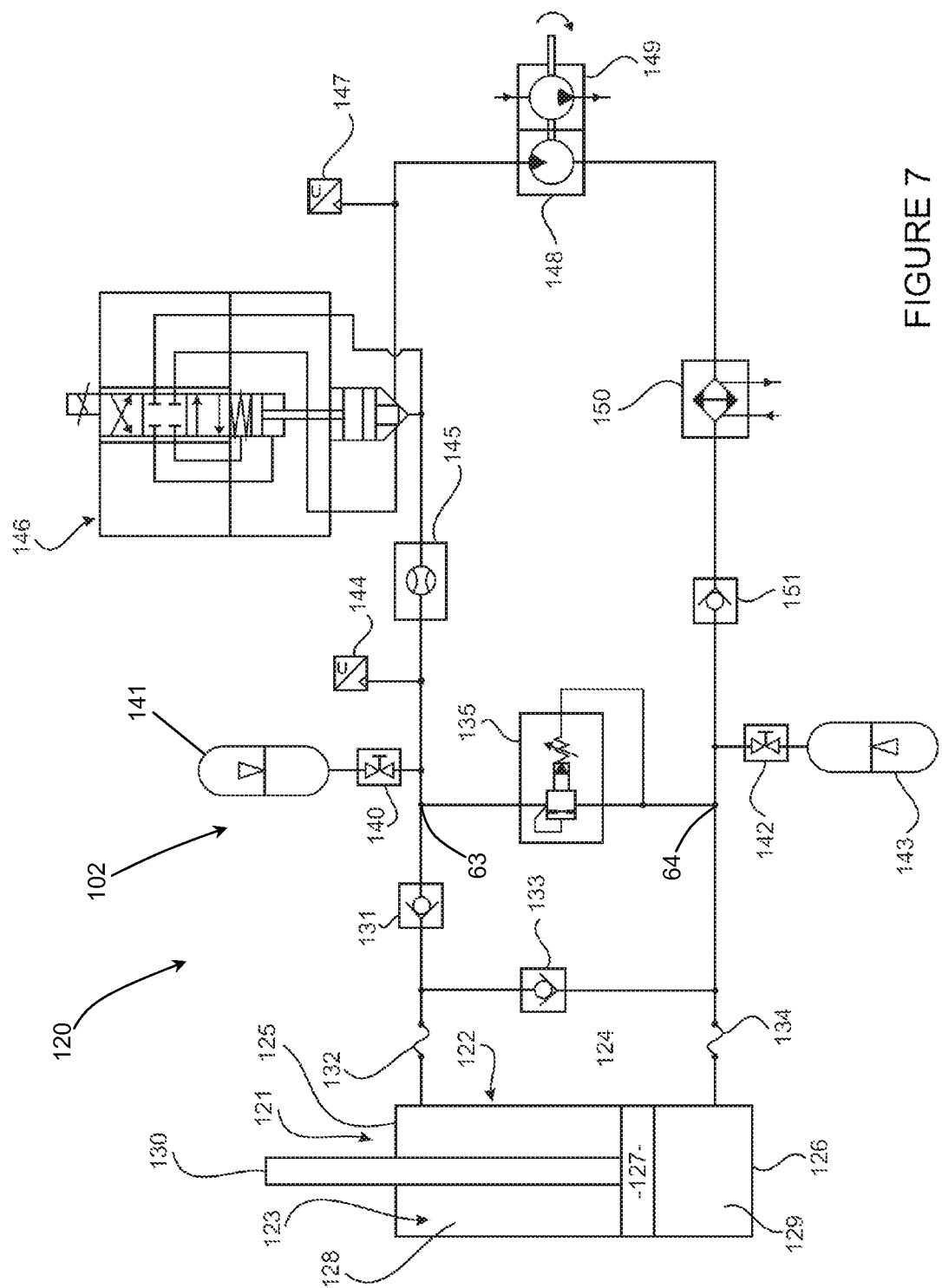
FIG. 7 is a schematic diagram of a sixth preferred embodiment of a hydraulic apparatus, including a cross-sectional side elevation of an axial hydraulic pump of the apparatus.

Referring to FIG. 7, a closed-loop hydraulic apparatus 120 for extracting energy from wave motion/converting wave energy includes an axial hydraulic pump 121 that includes a pump body 122 defining a chamber 123. The pump body 122 includes a side wall 124 having an upper end which is closed by a top wall 125, and a lower end which is closed by a bottom wall 126. The bottom wall 126 is configured for attachment to a base (not depicted).

A piston 127 is received by the chamber 123 such that the piston 127 partitions the chamber 123 into a working side 128 and a blind side 129, and such that the piston 127 is able to slide back and forth within the chamber 123. A seal (not depicted) between the piston 127 and the side wall 124 inhibits fluid from flowing past the piston 127 and between the working side 128 and the blind side 129.

A piston rod 130 extends from the piston 127 and through an opening in the top wall 125 of the pump body 122 such that the rod 130 is able to move back and forth with the piston 127 relative to the body 122. A seal (not depicted) inhibits fluid from leaking out of the chamber 123 through the opening.

An outlet check valve 131 is connected to the working side 128 of the chamber 123 via a quick disconnect 132. An inlet check valve 133 is connected in parallel to the working side 128 by the quick disconnect 132. Inlet check valve 133 is also connected in parallel to the blind side 129 of the chamber 123 by a quick disconnect 134. A sequence valve 135 is connected in parallel to the outlet check valve 131 and the inlet check valve 133.

A hydraulic control valve 140 is connected in series with an outlet hydraulic accumulator 141. The hydraulic control valve 140 is connected in parallel to the outlet check valve 131 and the sequence valve 135.

A hydraulic control valve 142 is connected in series with an inlet hydraulic accumulator 143. The hydraulic control valve 142 is connected in parallel to the sequence valve 135.

A pressure transducer 144 senses the pressure in a high pressure section of the apparatus 120, and a flow meter 145 measures the flow-rate of fluid in that section of the apparatus 120.

A proportional throttle 146 is connected in series with the flow meter 145, and a pressure transducer 147 senses the pressure of the fluid output from the proportional throttle 146.

The fluid which is output from the proportional throttle 146 drives a turbine 148 which in turn drives a water pump 149 for a cooler.

The low pressure fluid output from the turbine 148 drives a water pump 150 which cools the fluid returning to the pump 121, and passes through a check valve 151 which is connected in parallel to the sequence valve 135.

The valves 140 and 142, pressure transducers 144 and 147, flow meter 145, proportional throttle 146 and sequence valve 135 form part of a controller or control system for controlling the operation of the apparatus 120.

Apparatus 120 may provide for energy spillage. That is, it may provide for the dissipation of excess energy. For example, if the turbine 148 is driving an electricity generator connected to an electricity grid, and there is a grid failure, the apparatus 120 may dissipate energy rather than using the energy to rotate the turbine 148. Energy may be dissipated by operating the apparatus 120 to run lower pressures in the pump chamber 123, or by using the body of water in which the pump 31 resides as a heat sink by mechanically heating the water. The sequence valve 135 may be operated to bypass the turbine 148.

The operation of the apparatus 30, 60, 70, 100, 120 in a closed-loop enables many of the innovations described herein.

Importantly, the operation of the apparatus in a closed-loop mode allows a universal or standardised set of hardware to be used in many different locations around the world, and the response of each apparatus to be adjusted either actively in real-time, or preset, to suit different wave conditions, to allow for tidal variations and, most generally, to accommodate a wide range of anticipated operating scenarios occurring in different locations.

A benefit of having a universal or standardised system or collection of pumps, buoyant actuators, tethers and hydraulic equipment is that the manufacturing of such equipment can be streamlined and achieved at higher volumes and hence lower cost. Each set of equipment, when deployed on site, can be optimised via control algorithms that operate on the closed-loop hydraulic system. Each site can have a custom operating algorithm controlling the movement of hydraulic fluid in response to the wave and tidal dynamics of the site, optimising the output of energy and minimising wear or damage to the offshore equipment.

Figure 8:
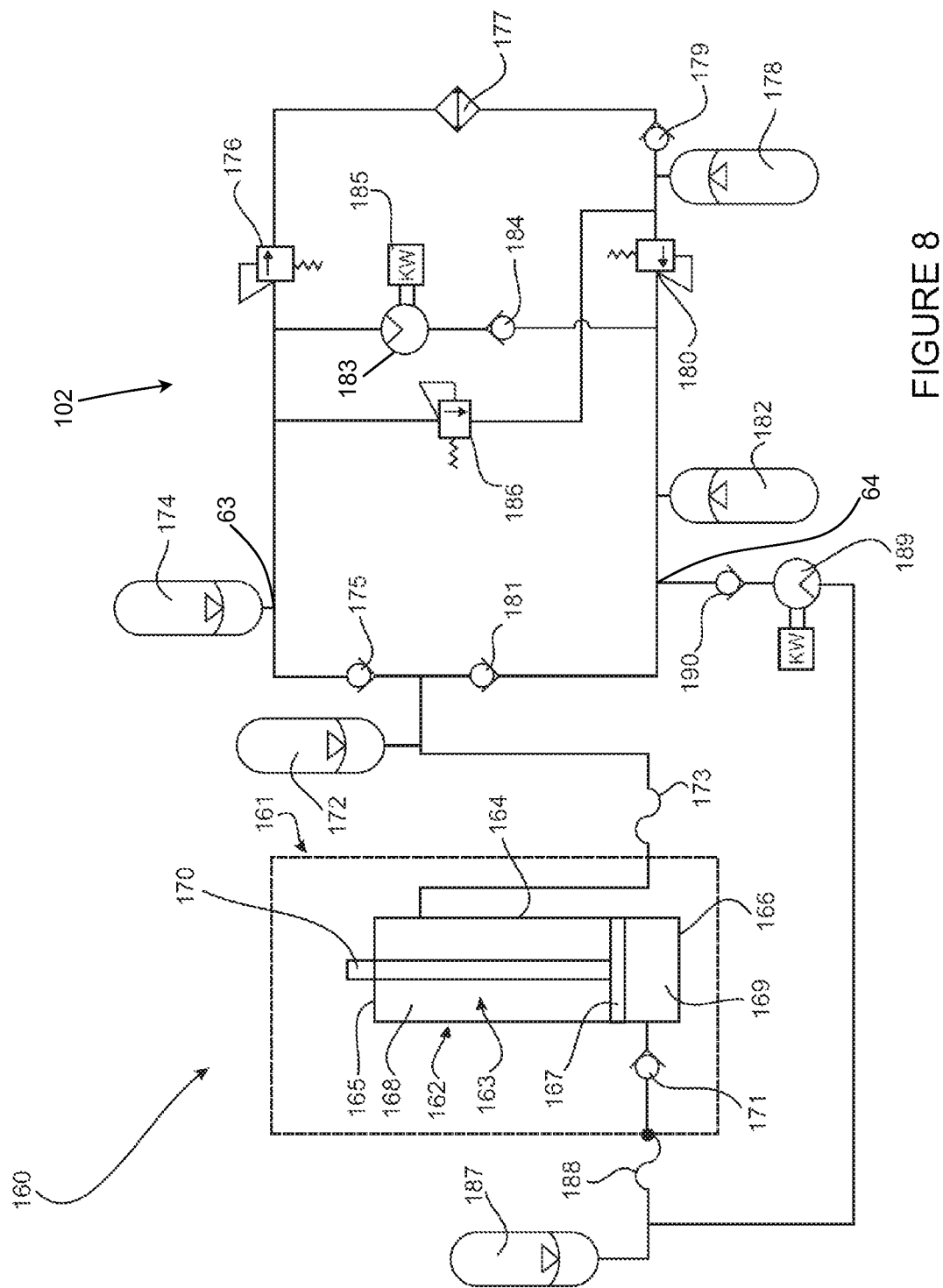
FIG. 8 is a schematic diagram of a seventh preferred embodiment of a hydraulic apparatus, including a cross-sectional side elevation of an axial hydraulic pump of the apparatus.

Referring to FIG. 8, a closed-loop hydraulic apparatus 160 for extracting energy from wave motion/converting wave energy includes an axial hydraulic pump 161 that includes a pump body 162 defining a chamber 163. The pump body 162 includes a side wall 164 having an upper end which is closed by a top wall 165, and a lower end which is closed by a bottom wall 166. The bottom wall 166 is configured for attachment to a base (not depicted) that rests on, or is secured to, the floor of a body of water in which the pump 161 resides.

A piston 167 is received by the chamber 163 such that the piston 167 partitions the chamber 163 into a working side 168 and a blind side 169, and such that the piston 167 is able to slide back and forth within the chamber 163. A seal (not depicted) between the piston 167 and the side wall 164 inhibits fluid from flowing past the piston 167 and between the working side 168 and the blind side 169.

A piston rod 170 extends from the piston 167 and through an opening in the top wall 165 of the pump body 162 such that the rod 170 is able to move back and forth with the piston 167 relative to the body 162. A seal (not depicted) inhibits fluid from leaking out of the chamber 163 through the opening.

Pump 161 also includes an outlet check valve 171 which is connected to the blind side 169 of the pump 161. Check valve 171 prevents fluid from flowing through it back towards the pump 161.

Although not depicted, a buoyant actuator is connected to an upper end of the piston rod 170 by a tether.

A tuning or working side hydraulic accumulator 172 is connected to the working side 168 of the pump 161 by a hose 173. Accumulator 172 is connected to an outlet hydraulic accumulator 174 by an outlet check valve 175 which prevents fluid from flowing through it back towards the pump 161. A controllable outlet valve 176 connects the outlet accumulator 174 to a heat exchanger 177. The heat exchanger 177 is connected to an intermediate hydraulic accumulator 178 by a check valve 179 that prevents fluid from flowing through it back towards the heat exchanger 177. A controllable inlet valve 180 is connected to an inlet check valve 181 which is connected to the working side 168 of the pump 161 and which prevents fluid from flowing through it and away from the pump 161. An inlet hydraulic accumulator 182 is connected to the working side 168 of the pump 161 by the check valve 181. A turbine 183 and a check valve 184 are connected in parallel with the valve 176, heat exchanger 177, accumulator 178, check valve 179, and the valve 180. Turbine 183 drives an electricity generator 185.

A pressure relief valve 186 is connected in parallel with the valve 176, heat exchanger 177, accumulator 178, and check valve 179. Pressure relief valve 186 functions to prevent over-pressurisation of the high pressure side of the hydraulic circuit of the apparatus 160. Pressure relief valve 186 may be a controllable valve.

The check valve 171 is connected to a drain/blind side hydraulic accumulator 187 by a hose 188, and is also connected to a refill electric pump 189. A check valve 190 connects the pump 189 in parallel to the check valve 181 and the accumulator 182. Check valve 190 prevents fluid from flowing through it and towards the pump 189.

The pump 189 is able to pump hydraulic fluid that accumulates in the blind side of the hydraulic circuit that includes the accumulator 187 back into the working side of the hydraulic circuit that is connected to the outlet of the pump 189.

Figure 9:
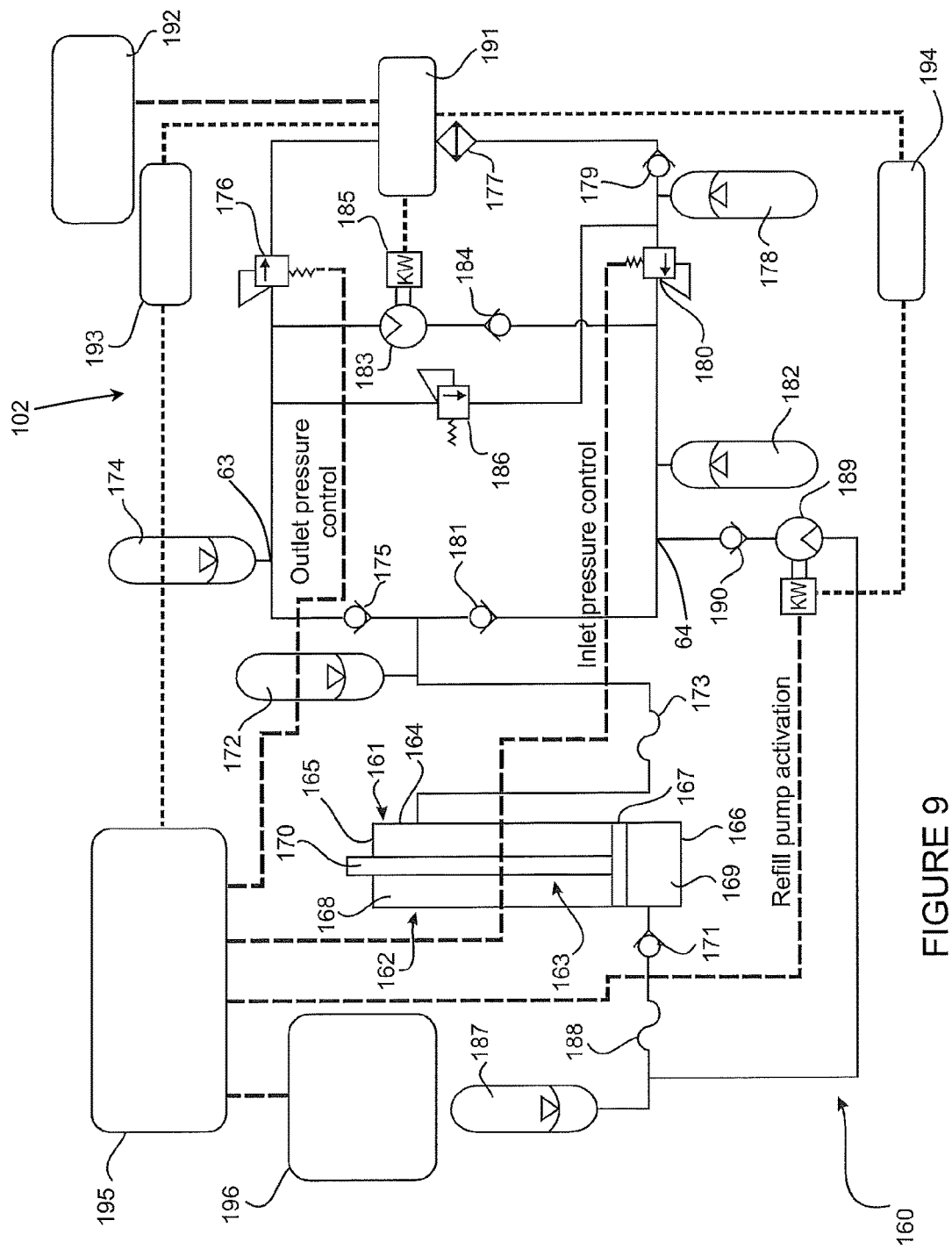
FIG. 9 is a schematic diagram depicting a hydraulic instrumentation and control system, and a battery charging system of the hydraulic apparatus illustrated in FIG. 8.

Referring to FIG. 9, the generator 185 supplies electric power to a charging device 191 which is connected to an external battery charging module 192. The charging device 191 and/or the external battery charging module 192 charge a battery 193 and a battery 194. Electrical power is supplied to the electric pump 189 by the battery 194. An instrumentation and control system/controller 195 is supplied with electrical power by the battery 193.

A plurality of sensors 196 are connected to one or more inputs of the controller 195. The sensors 196 include sensors of various types including pressure, temperature, and flow sensors that sense pressures, temperatures, and flow rates of hydraulic fluid within the apparatus 160.

The outlet valve 176, inlet valve 180, and refill electric pump 189 are connected to outputs of the controller 195 so that the controller 195 is able to control the operation of the outlet valve 176, inlet valve 180, and the pump 189. The controller 195 may control the operation of the outlet valve 176, inlet valve 180, and the pump 189 in response to the output(s) of the sensors 196. In other words, the controller 195 may control the operation of the outlet valve 176, inlet valve 180, and the pump 189 in response to the pressures, temperatures, and flow rates that are sensed by the sensors 196.

The pressure relief valve 186 may also be connected to an output of the controller 195 so that the operation of that valve 186 is also able to be controlled by the controller 195.

The controller 195 may control the outlet valve 176, inlet valve 180, pump 189, and/or the pressure relief valve 186 so that the apparatus 160 is able to extract, convert, or transfer an optimum or near optimum amount of energy from the wave motion of the body of water in which the apparatus 160 resides.

Figure 10:
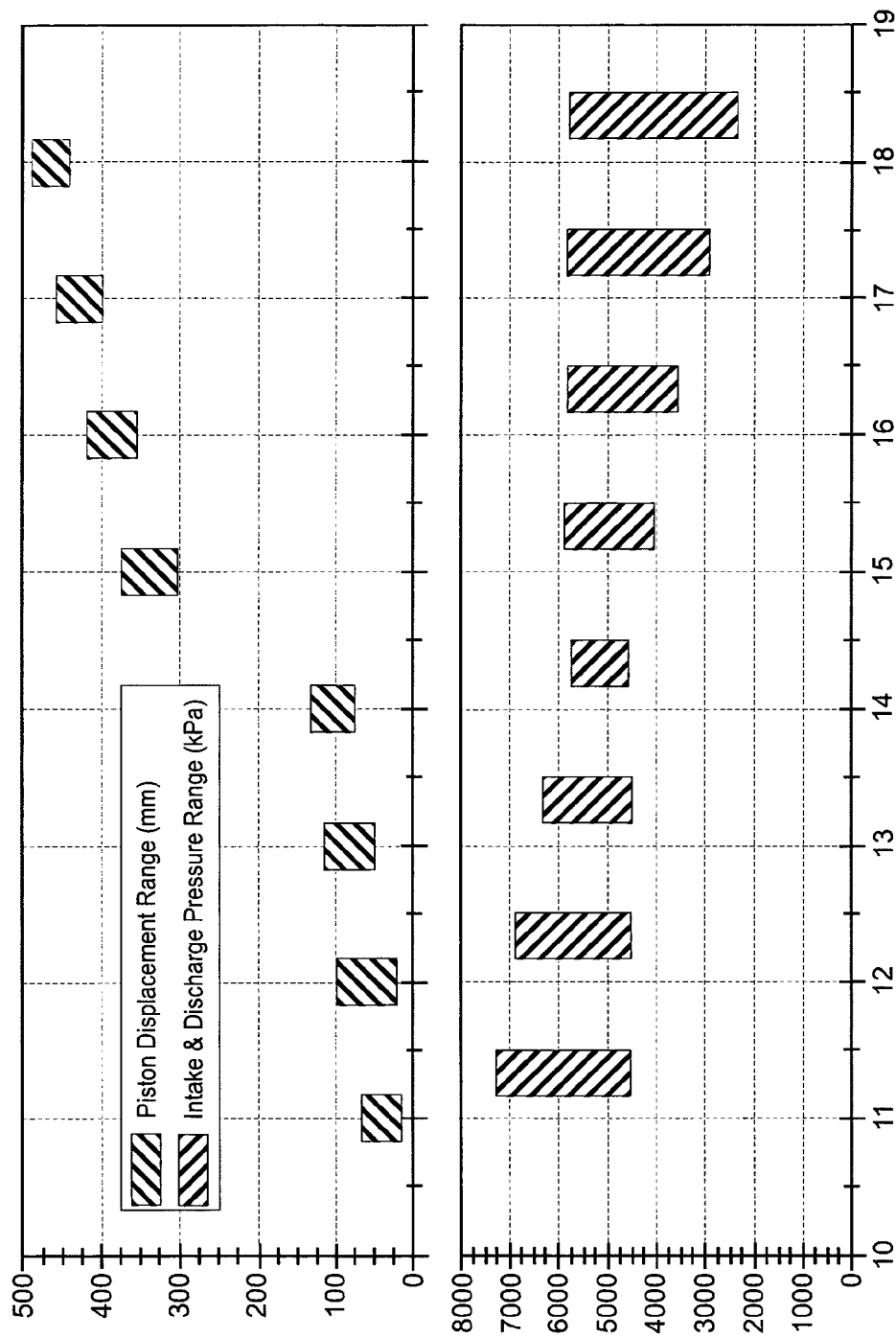
FIG. 10 is a graph which depicts the piston displacement range of a hydraulic apparatus such as the apparatus depicted in FIGS. 8 and 9, versus various intake and discharge pressure ranges.

Varying the intake and discharge pressures of the hydraulic circuit permits a degree of control over the piston stroke. The ranges of average piston stroke limits/piston displacement range of a hydraulic apparatus such as the apparatus 160 with respect to/versus average control pressures (Hsig=0.45 m, Tsig=3 s)/various intake and discharge pressure ranges for a period of constant wave conditions is depicted in FIG. 10. It can be seen that as the maximum value of the intake and pressure ranges decreases that the minimum valve of the piston displacement range increases. Similar charts/graphs for other types of wave conditions can also be obtained.

The hydraulic system/apparatus 160 concept is a closed loop system/apparatus 160 that is able to maintain the appropriate pressures at the pump inlet and outlet. When the pump moves, pressure and flow are generated in the hydraulic circuit. The hydraulic circuit's pressure is controlled by two control valves 176, 180; one control valve (i.e. the outlet valve 176) controls the pressure out of the pump 161, and the other control valve (i.e. the inlet valve 180) controls pressure into the pump 161. These (the outlet valve 176 and the inlet valve 180) are the two major control 'levers' in the system/apparatus 160. Both control valves 176, 180 are remotely controlled in order to vary the pressure for different wave regimes. For this system configuration, the Pelton turbine is replaced with two control valves and the heat exchanger 177 as a means of dissipating the energy generated by the pump 161. On the blind side 169, there is no fluid transfer. A partial vacuum is created during the pump extension. In case of internal leakage through the piston seals, the fluid will be evacuated through a leakage drain and the check valve 171 will prevent fluid returning back into the pump 161 during the pump/piston 167/piston rod 170 extension.

The rod/tuning/working side hydraulic accumulator 172 plays a key role in the optimisation of the system/apparatus 160. Adjusting the gas charge and volume of the accumulator 172 allows control over the power flow and the dynamics of the power flow. Also, it is a feature of this closed loop system/apparatus 160 that dynamic effects similar to 'water hammer', i.e. momentum transfer effects, can be mitigated by judicious adjustment of the tuning/working side hydraulic accumulator 172 as well as the outlet accumulator 174 and the inlet accumulator 182. The momentum transfer effects can be caused by one or more of the check valves bouncing.

The pressure relief valve 186 prevents the system/apparatus 160 from over-pressurisation. The system/apparatus 160 concept includes accumulators 172, 174, 178, 182 on the rod/working side 168 of the pump 161 to allow for storing the hydraulic energy and to manage pressure variations. The drain/blind side accumulator 187 stores the hydraulic fluid issued from internal leakages at the pump or system level before it is re-pressurised into the main (i.e. working side) hydraulic circuit of the apparatus 160. The check valves 171, 175, 179, 181, 184 ensure that the flow of hydraulic fluid through the hydraulic circuit occurs in the correct direction(s). There is also a tuning/working side hydraulic accumulator 172 just before the pump outlet check valve 175 in order to tune the system/apparatus 160 and optimise the power produced.

The flow of fluid through the apparatus 160 is able to be varied between a 'soft' case and a 'hard' case. In the soft case, which corresponds to the lowest load on the pump 161, the pressure relief valve 186 is fully open so that a substantial proportion of the fluid is pumped through the valve 186. In the hard case, which corresponds to the highest load on the pump 161, the pressure relief valve 186 and the inlet valve 180 are fully closed, and the outlet valve 176 is fully open.

The small battery operated pump (i.e. refill electric pump 189) returns lost fluid due to internal pump leaking from the working side 168 of the pump 161 to the blind side 169 of the pump 161.

As described/shown in FIG. 9, all instruments/sensors 196, valves 176, 180, and the return/refill electric pump 189 interface to a locally mounted control system/controller 195. The system/apparatus 160 includes two batteries 193, 194. The main battery (i.e. battery 193) supplies electrical power to the instrumentation and control system including the instruments/sensors 196, valves 176, 180, and the control system/controller 195. The secondary battery 194 supplies electrical power to the refill pump 189 and to ancillary equipment.

Figure 11:
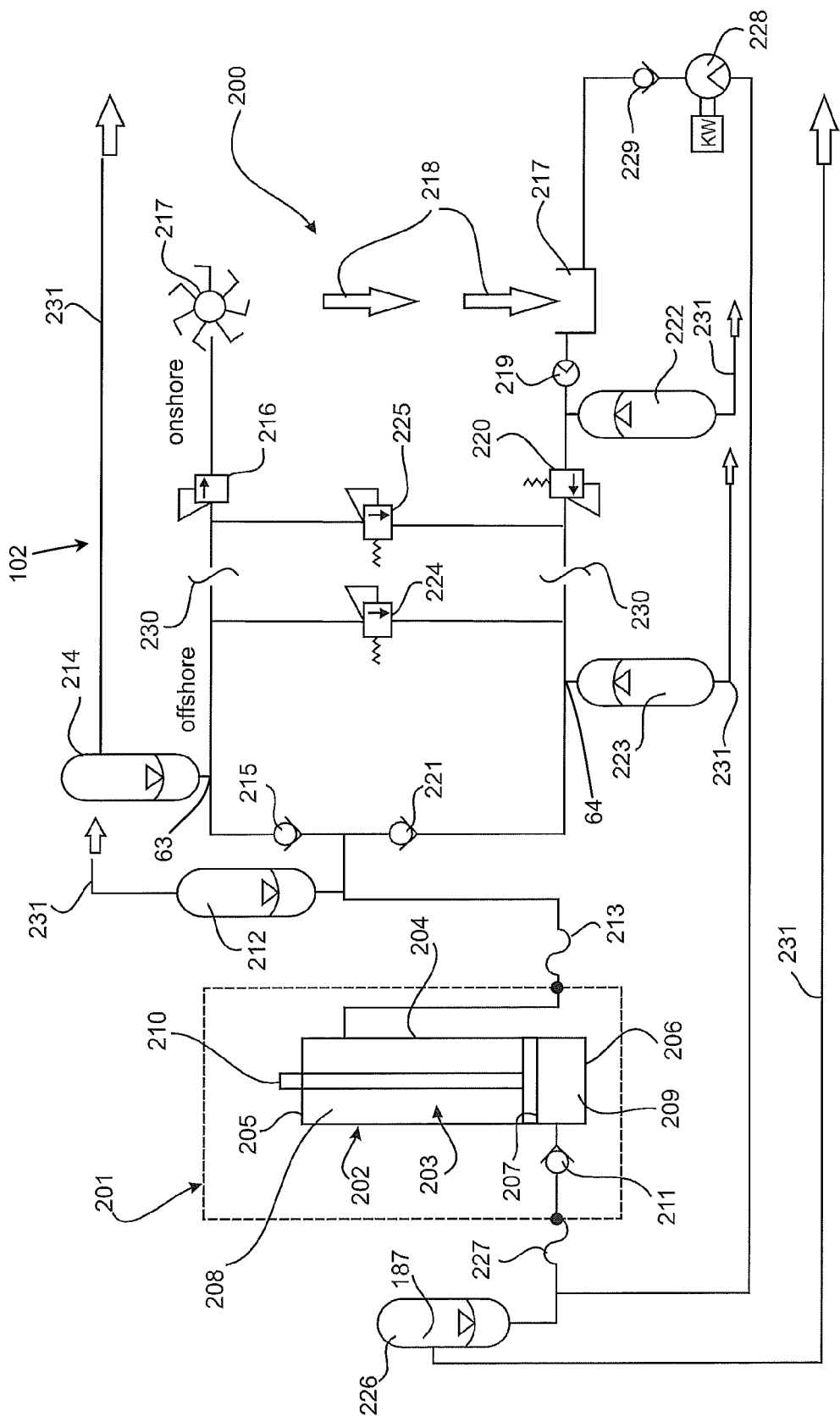
FIG. 11 is a schematic diagram of an eighth preferred embodiment of a hydraulic apparatus, including a cross-sectional side elevation of an axial hydraulic pump of the apparatus.

Referring to FIG. 11, a closed-loop hydraulic apparatus 200 for extracting energy from wave motion/converting wave energy includes an axial hydraulic pump 201 that includes a pump body 202 defining a chamber 203. The pump body 202 includes a side wall 204 having an upper end which is closed by a top wall 205, and a lower end which is closed by a bottom wall 206. The bottom wall 206 is configured for attachment to a base (not depicted) that rests on, or is secured to, the floor of a body of water in which the pump 201 resides.

A piston 207 is received by the chamber 203 such that the piston 207 partitions the chamber 203 into a working side 208 and a blind side 209, and such that the piston 207 is able to slide back and forth within the chamber 203. A seal (not depicted) between the piston 207 and the side wall 204 inhibits fluid from flowing past the piston 207 and between the working side 208 and the blind side 209.

A piston rod 210 extends from the piston 207 and through an opening in the top wall 205 of the pump body 202 such that the rod 210 is able to move back and forth with the piston 207 relative to the body 202. A seal (not depicted) inhibits fluid from leaking out of the chamber 203 through the opening.

Pump 201 also includes a check valve 211 which is connected to the blind side 209 of the pump 201.

Although not depicted, a buoyant actuator is connected to an upper end of the piston rod 210 by a tether.

A rod/tuning/working side hydraulic accumulator 212 is connected to the working side 208 of the pump 201 by a hose 213. Accumulator 212 is connected to an outlet hydraulic accumulator 214 by a check valve 215. A controllable outlet valve 216 connects the outlet accumulator 214 to a turbine or Pelton wheel 217 so that hydraulic fluid which flows out of the valve 216 is able to rotate the turbine or wheel 217. The turbine or wheel 217 may be connected to an electricity generator (not depicted) so that rotation of the turbine or wheel 217 is able to drive the generator such that the generator produces or generates electricity. The output or outlet of the turbine or wheel 217 is connected to a tank or reservoir 217 so that the low pressure hydraulic fluid which exits the turbine or wheel 217 flows into the reservoir 217 as indicated by the arrows 218. The reservoir 217 is connected to the working side 208 of the pump 201 by a pump 219, a controllable inlet valve 220, a check valve 221, and the hose 213. The pump 219 is operable to pump fluid towards the pump 201. An intermediate hydraulic accumulator 222 is connected to the working side 208 of the pump 201 in parallel with the pump 219 and the inlet valve 220. An inlet hydraulic accumulator 223 is connected to the working side 208 of the pump 201 in parallel to the check valve 221. A pressure relief valve 224 and a pressure relief valve 225 are connected between the high pressure side of the hydraulic circuit that is connected to the working side 208 of the pump 201, and the low pressure side of that hydraulic circuit. The pressure relief valve 224 and/or the pressure relief valve 225 may be controllable.

The check valve 211 is connected to a drain/blind side hydraulic accumulator 226 by a hose 227, and is also connected to a refill electric pump 228. A check valve 229 connects the pump 228 to the reservoir 217. The pump 228 is able to pump hydraulic fluid that accumulates in the blind side of the hydraulic circuit that includes the accumulator 226 back into the reservoir 217 which is on the working side of the hydraulic circuit that is connected to the outlet of the pump 228.

All of the components of the apparatus 200 that are located on the left hand side of break lines 230 are located offshore in the body of water, whereas all of the components of the apparatus 200 that are located on the right hand side of the break lines 230 are located onshore.

Although not depicted in FIG. 11, the apparatus 200 also includes means for powering the various components of the apparatus 200. For example, if the turbine or Pelton wheel 217 drives an electricity generator, that generator may supply electrical power to a charging device. The charging device together with a battery charging module may charge one or more batteries of the apparatus 200 which supply electrical power to the various powered components of the apparatus 200.

A respective air/gas charge line 231 connects each of the accumulators 212, 214, 222, 223, 226 to one or more shore-based sources of charging air/gas (not depicted).

Like the apparatus 160, the apparatus 200 may also include an instrumentation and control system/controller (not depicted). The controller may be supplied with power from the batteries of the apparatus 200.

A plurality of sensors (not depicted) is connected to one or more inputs of the controller of the apparatus 160. The sensors may include sensors of various types including pressure, temperature, and flow sensors that sense pressures, temperatures, and flow rates of hydraulic fluid within the apparatus 200.

The outlet valve 216, inlet valve 220, refill pump 228, pressure relief valve 224, and/or pressure relief valve 225 may be controlled by the controller. The controller may control the operation of the outlet valve 216, inlet valve 220, refill pump 228, pressure relief valve 224, and/or pressure relief valve 225 in response to the output(s) of the sensor(s) connected to the input(s) of the controller. In other words, the controller may control the operation of the outlet valve 216, inlet valve 220, refill pump 228, pressure relief valve 224, and/or pressure relief valve 225 in response to the pressures, temperatures, and flow rates that are sensed by the various sensors.

The controller may control the outlet valve 216, inlet valve 220, refill pump 228, pressure relief valve 224, and/or pressure relief valve 225 so that the apparatus 200 is able to extract, convert, or transfer an optimum or near optimum amount of energy from the wave motion of the body of water in which the apparatus 200 resides.

There is a single line/hose/pipe to the working side 208 of the pump chamber 203, and the tuning/working side hydraulic accumulator 212 is connected to that line. The drain/blind side hydraulic accumulator 226 and the electric refill pump 228 which are located onshore transfer fluid that leaks from the blind side 209 of the pump 201 to the inlet line of the main hydraulic circuit that is connected to the working side of the pump 201. The pressure relief valve 224 connects the outlet and inlet lines of the main hydraulic circuit at the offshore end of the loop near the pump 201. The pressure relief valve 224 provides a failsafe against overpressure within the main hydraulic circuit. The pressure relief valve 225, which may or may not be present, and which, if present, is located onshore, provides redundancy in case of failure of the offshore pressure relief valve 224.

The outlet stream/flow of hydraulic fluid drives the turbine 217, and the spent/low pressure fluid at the outlet of the turbine 217 is returned to the reservoir/accumulation tank 217 for re-pressurisation and return to the pump 201. The lines 231 with the arrows at their ends go onshore and are control points. The gas charge in the lines 231 of the various accumulators may be varied from onshore in accordance with a control algorithm.

The function of the outlet control valve 216 may be undertaken by an inlet or spear valve (as it is called) for the Pelton turbine/wheel 217, in which case there is no need for a separate outlet valve 216 components as it is contained within the Pelton turbine/wheel assembly 217.

Figure 12:
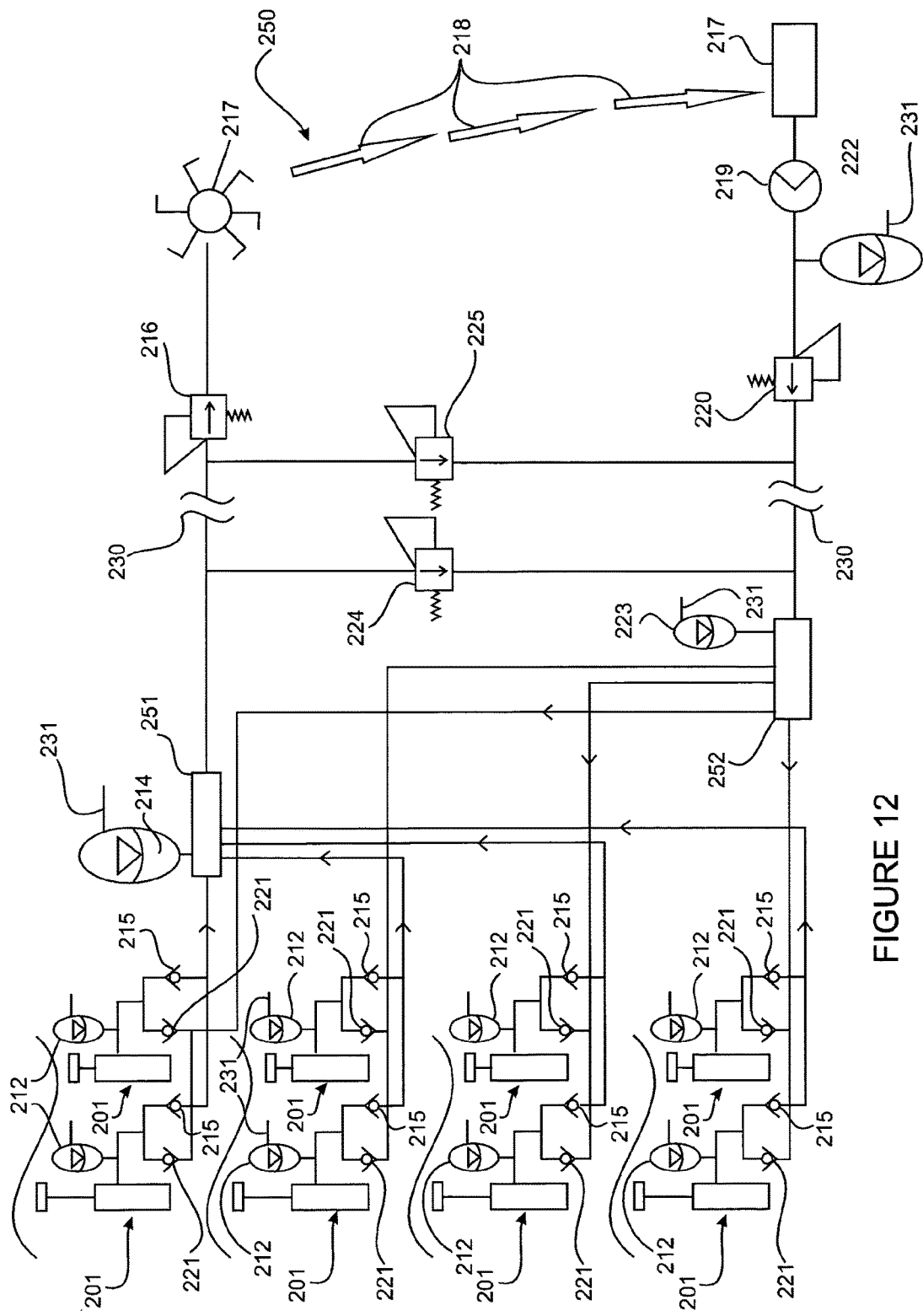
FIG. 12 is a schematic diagram of a ninth preferred embodiment of a hydraulic apparatus.

Referring to FIG. 12, a closed-loop hydraulic apparatus 250 for extracting energy from wave motion/converting wave energy is similar to the apparatus 200 except that the apparatus 250 includes an array of eight of the axial hydraulic pumps/wave energy converters (WEC) 201, with each of the pumps 201 having a respective tuning/working side hydraulic accumulator 212 and check valves 215, 221 connected to the working side 208 of the pump 201. Apparatus 250 models a full-scale system that comprises multiple 'CETO™' wave energy converter units.

Each of the check valves 215 is connected to a manifold 251, and each of the check valves 221 is connected to a manifold 252. Manifold 251 is connected to outlet hydraulic accumulator 214, and manifold 252 is connected to inlet hydraulic accumulator 223.

The blind side of each pump 201 may be connected to one or more drain/blind side hydraulic accumulators 226 via one or more hoses 227 and check valves 211, and also to a refill electric pump 228 which may be connected to the reservoir 217 of the apparatus 250 via a check valve 229.

A respective air/gas charge line 231 depicted with asterisks connects each of the accumulators 212, 214, 222, 223, 226 of the apparatus 250 to one or more shore-based sources of charging air/gas (not depicted).

Typically the pumps 201 of the apparatus 250 will be arranged in an array such that is no more than three rows deep.

The pumps 201 may or may not be identical pumps.

In a typical plant/apparatus of the type depicted in FIG. 12, the apparatus could consist of a multiple array of 8 pumps 201 connected together offshore with offshore accumulation supplying flow to the turbine/Pelton wheel 217 onshore. The external pump 219 onshore would supply the flow back to the pump to drive the pistons of the offshore pumps 201 down. This is shown schematically in FIG. 12, as an example. Alternatively, the pressurised hydraulic fluid on the turbine/Pelton wheel 217 may be used to supply the flow back to the pumps 201 to drive the pistons of the pumps 201 down.

An operational power station utilising pumps/point WEC's may be configured from any number of units; the number of units is determined by the overall power output requirement of the power station. A point WEC will be understood as being any WEC that behaves as a single point absorber of energy.

The above describes various systems for control and optimisation of a wave energy device. The wave energy device comprises a wave energy converter (WEC) utilising a WEC with hydraulic power takeoff, such as a CETO™ wave energy converter which is a particular type of WEC. The WEC is operated in closed loop mode. The closed loop comprises a device outlet line at higher pressure, and an inlet (return) fluid line at substantially lower pressure. The fluid circulating in the closed loop is substantially water based. The fluid provides transfer of energy to shore. The fluid transports energy via pressure and flow. In addition, there is a means to remove energy from the working fluid onshore via a hydro mechanical device such as a turbine or pressure exchange engine.

The system may include control elements that are located onshore and/or offshore. The control elements may comprise valves regulating the pressure and flow in the outlet line and the inlet lines onshore. In addition, the control elements may include an offshore pressure relief valve located between the inlet and outlet lines. The control elements may also include hydraulic accumulators located offshore. Moreover, the control elements may include hydraulic accumulators located onshore, one connected to the outlet line and another connected to the input line. Furthermore, the control elements may include a pressure relief valve located onshore between the inlet and outlet lines.

The system may use a control algorithm to control the control elements. For example, if the control elements include hydraulic valves and gas pressure charges in the accumulators, the control algorithm may be used to control them.

The control algorithm may perform one or more of the following functions, or have one or more of the following properties:

a. Adjusts the mechanical stiffness by means of accumulator volume variation (open/close valves) of the CETO™ WEC between, and including, the two extremes of piston constrained and piston free. 'Piston-constrained' refers to the situation where the piston will experience the minimum amount of movement because the hydraulic fluid is constrained against movement inside the hydraulic circuit to the extent allowed by the tuning accumulator; and 'piston free' refers to the case where there is free flow of fluid between inlet and outlet circuits and the piston motion is free to move under the influence of its own weight and the external force applied to it.

b. Adjusts the reference position of the piston of the pump in the case of a CETO™ wave energy converter to accommodate slow variations in water depth as would occur for tides.

c. Adjust the control elements of the WEC device according to real time inputs from a nearby wave measuring apparatus. Such apparatus may record instantaneous wave height (H), wave period (T), and wave spread (θ) and any other relevant parameters that define the sea state and may provide this data in real time to the algorithm.

d. Adjusts the setting in c) so that the power P is an instantaneous maximum.

e. Adjusts the settings in c) so that the power P is an instantaneous minimum. Such a condition may be desirable if maintenance or inspection is being carried out.

f. Adjusts the settings in c) so that P exceeds a minimum value $P_m$ with a probability $p_m$.

g. Applies a preset template F to constrain the values of the control elements which maximises the total power delivered by a WEC in a time interval τ.

h. The time interval τ may be variable over a range of epochs $\tau_\epsilon$ from seconds to minutes to hours. For example, standard offshore practice is 20 minutes for a continuous irregular sea state and three hours for an extreme sea state.

i. Each epoch $\tau_\epsilon$ will be associated with a unique template $F_\epsilon$ which defines a set operating point for, and range of control exerted by, the algorithm A.

j. The control algorithm A may comprise a series of templates $F_\epsilon$ as in i) such that each template cooperates to provide the optimum energy output $E_{max}$ over any time epoch between the shortest and the longest. That is, the algorithm A is always tuned to providing the maximum integrated energy $E_{max}$ where $$E_{max} = \int_{\tau_{\epsilon min}}^{\tau_{\epsilon max}} P(A, F_\epsilon(\tau)) dt$$

k. The particular algorithm A may also be drawn from an ensemble of algorithms $A_i$ where the ensemble $A_i$ includes elements that are specific to one or more of the following conditions:
a. A particular geographic location;
b. A particular water depth and bathymetry;
c. A particular classification of wave activity for example, energetic, offshore, mild, inshore, or combinations of these;
d. A particular time of the year, for instance, winter, summer;
e. A particular configuration of the WEC;
f. A particular physical configuration of the WEC including an energy relief mechanism as has been described in CETO™ wave energy converter co-pending patent applications;
g. A particular physical state of the WEC corresponding to the age, state, to operating history of the WEC;
h. Any other variations in the configuration of the WEC;
i. Yearly dominate sea states. For example, a site at Garden Island off the coast of Western Australia has between 6 and 8 dominate sea states; and
j. A particular safety/emergency condition.

The above also describes a system comprising an array of WEC's connected together in parallel to a common set of inlet and outlet piping forming a closed loop system as described above.

In the system that comprises an array of WEC's, the optimisation of the algorithm A is also sensitive to the wave spread. The algorithms $A_i$ and the templates $F_\epsilon$ are materially different from those of a single WEC. Note that for multiple units the difference in algorithm compared to the single unit is dominated by the hydraulic interaction between units.

Also described is a system according to all of the aforementioned systems where the algorithms $A_i$ are generated according to an optimal filter approach.

The response of a single point absorber wave energy converter (WEC) such as a single CETO™ wave energy converter unit may be described mathematically with the aid of the power function P(H, T, θ), indicating that in principle the instantaneous power is a function of instantaneous wave height, H, instantaneous wave period T, and instantaneous angle of spread of the waves. A real sea can have multiple wave directions, wind waves, swell waves and possibly other components as well.

The function P represents instantaneous power.

The generation of the response function P may be achieved in a number of ways:
i. By exciting the single WEC with a pulse train of sine wave excitations of a known period T and amplitude H and measuring the resultant instantaneous power P.
ii. By simulating the inputs to the WEC in a finite element model and/or dynamic simulation model that accurately describes the power output as a function of these variables.

The process above leads to a three dimensional surface map of instantaneous power versus instantaneous wave period and instantaneous wave height, commonly referred to as the 'power matrix'. The power matrix describes the mechanical response of the system which is subject to the sea state and to the controls that can be exerted, as described above. For a hypothetical sinusoidal wave disturbance the integration of the function P over a time τ yields the average energy delivered in time τ for a given value of wave height and wave period.

The wave height and period of real water waves have both temporal and spatial stochastic (random) variations. Temporal and spatial distribution functions are employed to characterise these variations as well as the correlations between them. The resultant distributions, and empirical models such as the Pierson Moskowitz spectrum, yield wave height spectral distributions in (wave height)$^2$ per unit frequency interval with units of m$^2$/Hz. The accuracy to which these distribution functions can describe and predict the typical wave climate at a given location and at a given time of year depends on how extensive a data record of real or modelled data is available at that site. The more extensive the record of observations or modelling at a site the greater the statistical confidence level in the predictive power of the models derived from the data.

The statistically predicted performance in terms of power output of a WEC at a given location and at a given time of year is obtained from the convolution of the machine response (via the power matrix) and the wave model; that is, the convolution function. The total predicted energy output over a time τ is given by the time integral of the convolution function.

If the convolution function is robust, that is, if it can be used to predict power outputs with high statistical confidence, then this function may be employed to optimise the response of the WEC (i.e. closed-loop hydraulic apparatus such as the apparatus 160, 200, 250) by applying it as an optimal filter. An optimal filter uses knowledge of the system characteristics as well as the spectral characteristics of the disturbances that drive it, in this case the waves, to maximise a given output, in this case the energy produced by the WEC.

The process of implementing an optimal filter leads to the control algorithms $A_i$ and their associated control set-points and control ranges, denoted by F, described above. The optimal filter methodology yields a control algorithm which alters the control elements of the WEC (which are as described above), such that the energy output of the device is maximised over a timescale τ.

The methodology for generating an optimal filter and the derived algorithms is as follows for a single wave site location:
i. Determine the power matrix P for the wave energy converter using the method outlined above. The power matrix will be a function of the state variables of the system as well as a function of time. The state variables include:

ii. the pressure and flows in the outlet and return loops, and the gas charge pressures and volumes of the various accumulators in the system.

iii. Determine the most robust spectral model for the sea states applicable to the physical location of the WEC. Use methods above. It is most likely any location can be described by a fixed number of dominant sea states iv. Convolve the sea state spectral density with the power matrix. Be aware that there may be natural correlations between variables of wave height and wave period. The resultant transfer function relates the power production of the unit to the state variable of the WEC as well as to the parameters of the driving ocean. The function may be integrated over time to obtain an estimate of the average energy predicted output of the WEC over that time interval. This energy estimate is a function of the state variables of the WEC over which the control algorithms operate, as well as being determined by the parameters of the ocean model used to predict the spectrum of ocean disturbances.

v. Perform a multi parameter optimisation of the energy function (state variables) applying the techniques of vector calculus and find local and global extrema using standard routines such as the Newton-Raphson method. Those skilled in the art of numerical analysis and multivariate optimisation will be familiar with these techniques and under which mathematical conditions they may be applied.

vi. Define operating points and stable operating regions within the vector space of the energy function $E_{max}$. This generates the templates F.

vii. Apply control system transfer function to the state variables to generate the control algorithm A.

viii. Run a simulation of the control algorithm to verify accuracy and stability of the algorithm A and the set point F.

ix. Repeat the above steps from ii) onwards with different sea states as needed to populate the space of required algorithms $A_i$. Repeat from i) if this ensemble also includes variations to the state of the machine.

An important feature of this algorithm development process and subsequent application to the WEC is that it can be made heuristic, that is, it has the ability to learn over the operational life of the WEC. Initial model estimates of the wave statistics at a given site may be relatively unrefined and the confidence level of their prediction can be improved over time as the WEC operates and a more detailed statistical picture of the wave climate is built up. The learning is achieved by feeding this information back into the algorithm generating process at ii). Similarly there is an opportunity for heuristic process in the power matrix as information about the ageing of the equipment is gathered over the operational life and fed back into the algorithm generation process at i). In both cases the heuristic development leads to a more complete ensemble of algorithms $A_i$ and templates F to optimise the energy output under all conditions encountered during the operational life of the wave energy converter.

The above discussion and methodology applies equally to a wave farm or array of multiple WECs. The only difference here is that there would be more state variables to be controlled because there is greater complexity in the plant and a) There will be angular dependence which is referred to as 'spread' in the power matrix;

b) There will be interaction effects between individual units in the WEC array; and c) The distribution of arrival angles for sea states will now need to be included in the wave modelling.

With respect to the optimization, a discussion is useful. To optimize the system:

1. First determine the power matrix.
2. Develop and optimize the system transfer function using the power matrix and a wave model.
3. Optimize the transfer function for a particular site using a robust spectral model for a physical site. This is where the control algorithms come into play.

The formula that goes with this is:

$$\underbrace{P_{sys}(\omega)}_{\text{Power spectrum}} = \underbrace{H_{sys}(\omega)}_{\text{System transfer function}} \cdot \underbrace{S_\zeta(\omega)}_{\text{Irregular wave spectrum}}$$

The waves that drive the pump of the apparatus are an irregular input conditioner which means that the pump of the apparatus is driven irregularly. The apparatus therefore needs to be controlled in order to maximise its output. An optimal filter is used to control the apparatus. The parameters of the system/apparatus are set according to the 'recipe' provided by the optimal filter. The optimal filter will normally be different or change according to the location of the apparatus, or the season e.g. summer, winter, etc. The optimal filter may be obtained by testing the system/apparatus using different parameters and/or by using models. Controlling the apparatus according to the optimal filter enables the energy under a power curve of the apparatus to be maximised.

It will be appreciated by those skilled in the art that variations and modifications to the invention described herein will be apparent without departing from the spirit and scope thereof. The variations and modifications as would be apparent to persons skilled in the art are deemed to fall within the broad scope and ambit of the invention as herein set forth.

Throughout the specification and claims, unless the context requires otherwise, the word "comprise" or variations such as "comprises" or "comprising", will be understood to imply the inclusion of a stated integer or group of integers but not the exclusion of any other integer or group of integers.

Throughout the specification and claims, unless the context requires otherwise, the term "substantially" or "about" will be understood to not be limited to the value for the range qualified by the terms.

It will be clearly understood that, if a prior art publication is referred to herein, that reference does not constitute an admission that the publication forms part of the common general knowledge in the art in Australia or in any other country.

The invention claimed is:

1. A closed-loop hydraulic apparatus for converting wave energy, the apparatus comprising: a pump for pumping a fluid through the apparatus, the pump including a body defining a chamber, and a piston that partitions the chamber into a working side and a blind side; a buoyant actuator connected to the piston; an inlet connected to the working side of the chamber so that the fluid is able to flow from the inlet and into the working side of the chamber; an outlet connected to the working side of the chamber so that the fluid is able to flow from the working side of the chamber to the outlet; and a hydraulic controller operable to control the mechanical stiffness of the pump by controlling the pressure of the fluid at the inlet and the outlet of the pump, wherein the hydraulic controller further includes:
- an inlet hydraulic accumulator;
- an input hydraulic control valve connected to the inlet and to the inlet hydraulic accumulator;
- an outlet hydraulic accumulator;
- an output hydraulic control valve connected to the outlet and to the outlet hydraulic accumulator;
- a sequence valve connected to the inlet and to the outlet;
- a first outlet pressure transducer connected to the outlet;
- a flow meter connected to the outlet;
- a proportional throttle connected to the flow meter; and
- a second outlet pressure transducer connected to the proportional throttle.

2. The closed-loop hydraulic apparatus of claim 1, wherein the hydraulic controller includes: a working side hydraulic accumulator connected to the working side of the chamber; an outlet hydraulic accumulator connected to the outlet; an inlet hydraulic accumulator connected to the inlet; an outlet valve connected to the outlet; an inlet valve connected to the inlet; a pressure relief valve connected to the outlet and to the inlet valve; an intermediate hydraulic accumulator connected to the inlet valve; a control system; and a plurality of sensors, wherein the control system is operable to control the outlet valve and the inlet valve in response to outputs of the sensors.

3. The closed-loop hydraulic apparatus of claim 1, wherein the hydraulic controller includes: a working side hydraulic accumulator connected to the working side of the chamber; an outlet hydraulic accumulator connected to the outlet; an inlet hydraulic accumulator connected to the inlet; a pressure relief valve connected to the outlet and to the inlet; an outlet valve connected to the outlet; an inlet valve connected to the inlet; and an intermediate hydraulic accumulator connected to the inlet valve.

4. The closed-loop hydraulic apparatus of claim 3, wherein the hydraulic controller also includes another pressure relief valve connected to the outlet and to the inlet.

5. The closed-loop hydraulic apparatus of claim 3, wherein the hydraulic controller also includes: a control system; and a plurality of sensors, wherein the control system is operable to control the outlet valve, inlet valve, and the pressure relief valve in response to outputs of the sensors.

6. The closed-loop hydraulic apparatus of claim 5, wherein the sensors include pressure, temperature, and flow sensors.

7. The closed-loop hydraulic apparatus of claim 3, wherein a gas charge in lines of the working side hydraulic accumulator, outlet hydraulic accumulator, inlet hydraulic accumulator, and the intermediate hydraulic accumulator are able to be varied.

8. The closed-loop hydraulic apparatus of claim 3, wherein the outlet valve is a spear valve for a Pelton wheel.

9. The closed-loop hydraulic apparatus of claim 3, wherein the apparatus further comprises: a plurality of pumps for pumping the fluid through the apparatus; a plurality of buoyant actuators connected to the pistons of the pumps; a plurality of inlets connected to the working sides of the pump chambers; and a plurality of outlets connected to the working sides of the pump chambers, and the hydraulic controller includes a plurality of working side hydraulic accumulators connected to the working sides of the pump chambers.

10. The closed-loop hydraulic apparatus of claim 9, wherein the pumps are arranged in an array that is no more than three rows deep.

11. The closed-loop hydraulic apparatus of claim 1, wherein the pumps are identical pumps.

12. A closed-loop hydraulic apparatus for converting wave energy, the apparatus comprising: a pump for pumping a fluid through the apparatus, the pump including a body defining a chamber, and a piston that partitions the chamber into a working side and a blind side; a buoyant actuator connected to the piston; an inlet connected to the working side of the chamber so that the fluid is able to flow from the inlet and into the working side of the chamber; an outlet connected to the working side of the chamber so that the fluid is able to flow from the working side of the chamber to the outlet; and a hydraulic controller, wherein the hydraulic controller includes:
- an inlet hydraulic accumulator;
- an input hydraulic control valve connected to the inlet and to the inlet hydraulic accumulator;
- an outlet hydraulic accumulator;
- an output hydraulic control valve connected to the outlet and to the outlet hydraulic accumulator;
- a sequence valve connected to the inlet and to the outlet;
- a first outlet pressure transducer connected to the outlet;
- a flow meter connected to the outlet;
- a proportional throttle connected to the flow meter; and
- a second outlet pressure transducer connected to the proportional throttle.

* * * * *